(12) United States Patent
Sogame et al.

(10) Patent No.: US 8,128,146 B2
(45) Date of Patent: Mar. 6, 2012

(54) TRUNK BOX STRUCTURE OF AUTOMOBILE

(75) Inventors: Katsumasa Sogame, Irvine, CA (US);
David Jason Coleman, Long Beach, CA (US)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 12/608,917

(22) Filed: Oct. 29, 2009

(65) Prior Publication Data

US 2011/0101721 A1    May 5, 2011

(51) Int. Cl.
*B60R 5/04* (2006.01)
(52) U.S. Cl. .................. 296/37.8; 296/37.14; 296/37.16
(58) Field of Classification Search ................ 296/39.1, 296/37.8, 37.14, 37.16
See application file for complete search history.

(56) References Cited

U.S. PATENT DOCUMENTS

| | | | | |
|---|---|---|---|---|
| 5,257,846 A * | 11/1993 | Kanai et al. | ................ | 296/37.14 |
| 5,322,335 A * | 6/1994 | Niemi | ........................ | 296/97.23 |
| 6,481,773 B1 * | 11/2002 | Salani et al. | ............... | 296/37.16 |
| 6,644,709 B2 * | 11/2003 | Inagaki et al. | ............. | 296/37.16 |
| 6,719,348 B1 * | 4/2004 | Song | ........................... | 296/39.1 |
| 6,945,594 B1 * | 9/2005 | Bejin et al. | ............... | 296/193.07 |
| 7,488,024 B1 * | 2/2009 | Medlar | ....................... | 296/37.14 |
| 7,503,610 B2 * | 3/2009 | Karagitz et al. | ........... | 296/37.16 |
| 7,600,800 B2 * | 10/2009 | Suzuki | ....................... | 296/37.16 |
| 7,661,742 B2 * | 2/2010 | Medlar et al. | .............. | 296/37.16 |
| 7,730,586 B2 * | 6/2010 | McDonald | ....................... | 16/326 |
| 7,819,453 B2 * | 10/2010 | Edwards | ................... | 296/37.14 |

FOREIGN PATENT DOCUMENTS

| | | |
|---|---|---|
| JP | 2005007936 | 1/2005 |
| JP | 2007137392 | 6/2007 |

* cited by examiner

*Primary Examiner* — Glenn Dayoan
*Assistant Examiner* — Gregory Blankenship
(74) *Attorney, Agent, or Firm* — Alleman Hall McCoy Russell & Tuttle LLP

(57) ABSTRACT

A cargo compartment structure for an automobile is disclosed. In one example, the cargo compartment comprises a trunk box disposed in a cargo compartment in a rear part of the automobile, the trunk box having an opening on its upper side; a cargo board capable of changing its position between a closed position where the opening is closed by the cargo board, and an open position where the opening is opened, the open position of the cargo board being frontward of the closed position; and a board holder for holding the cargo board in a specific state so that a top surface of the cargo board is downwardly inclined toward a rear side of the automobile and so that while the cargo board is in the open position, a rear end of the cargo board is disposed rearward of a front end of the trunk box.

4 Claims, 25 Drawing Sheets

TRUNK BOX STRUCTURE OF AUTOMOBILE

FIELD OF THE INVENTION

This invention relates to a trunk box disposed in a cargo compartment in a rear part of an automobile.

BACKGROUND

It is known that a trunk box (i.e., storage box) having an opening on its upper side is disposed in a cargo compartment in a rear part of an automobile. For example, Japanese Unexamined Patent Application Publication No. 2007-137392 discloses that a spare tire is stored in a trunk box disposed in a cargo compartment and that a user can store personal effects above the spare tire in the trunk box, as needed. The opening of this trunk box is covered with a cargo board. This cargo board can open and close the opening by turning around an axis provided at its front end.

Japanese Unexamined Patent Application Publication No. 2005-7936 discloses a cargo board capable of turning around to an open position (in which the cargo board opens an opening of a trunk box), a first hook provided on a backside of the cargo board at its rear end, and a second hook provided on a strap that is attached to a seat back of a rear seat. The cargo board is held in the open position by engaging the first hook with the second hook.

Recently, the number of SUVs (Sport Utility Vehicles) has increased. In such SUVs, dripping-wet personal effects (e.g., dripping-wet swimwear or dripping-wet marine sports equipment) are often loaded in a cargo compartment of the SUVs.

In order to prevent a floor of the cargo compartment from getting dripping-wet, it is effective to provide a trunk box (preferably a water-proof box) in the cargo compartment and to store the dripping-wet personal effects in the trunk box.

However, the dripping-wet personal effects cannot be stored completely in the trunk box in the case where there are many dripping-wet personal effects to be stored and/or in the case that the size of the dripping-wet personal effects is larger than that of the trunk box. Therefore, some dripping-wet personal effects that cannot be stored in the trunk box may reluctantly be placed on the floor of the cargo compartment. Also, large-sized dripping-wet personal effects might reluctantly be partly stored in the trunk box with one or more parts protruding from the trunk box. In these cases, water drops from the dripping-wet personal effects (which are placed on the floor or which protrude from the trunk box) may disadvantageously fall on the floor of the cargo compartment, which unfortunately may result in making the floor dripping-wet.

This invention is made so as to address this problem. A purpose of this invention is to prevent the floor of the cargo compartment from getting dripping-wet (due to water drops from dripping-wet personal effects), by enlarging the space (other than the floor) for placing dripping-wet personal effects, even when the size of the trunk box is small.

SUMMARY

To achieve the above purpose, in accordance with an aspect of the invention, a cargo compartment structure for an automobile comprises a trunk box disposed in a cargo compartment in a rear part of the automobile, the trunk box having an opening on its upper side; a cargo board capable of changing its position between a closed position where the opening is closed by the cargo board and an open position where the opening is opened, the open position of the cargo board being frontward of the closed position, and the cargo board being in the cargo compartment in the open position; and a board holder for holding the cargo board in a specific state so that a top surface of the cargo board is downwardly inclined toward a rear side of the automobile and so that while the cargo board is in the open position, a rear end of the cargo board is disposed rearward of a front end of the trunk box.

According to the above configuration, water drops from dripping-wet personal effects will flow rearward on the cargo board into the trunk box when the dripping-wet personal effects are placed on the cargo board that is in the specific state while the cargo board is in the open position. Therefore, it can prevent the floor from getting dripping-wet due to water drops from the dripping-wet personal effects, in the case that the dripping-wet personal effects are placed on the cargo board. Accordingly, the dripping-wet personal effects can be stored in the cargo compartment so as not to get the floor dripping-wet, by enlarging the space for placing the dripping-wet personal effects frontward of the trunk box, even in the case where there are so many dripping-wet personal effects to be stored and/or in the case that the size of the dripping-wet personal effects is larger than that of the trunk box.

In a preferable embodiment, the board holder may be provided on a backside of a seat back of a seat that is disposed frontward of the cargo compartment, and the board holder may hold the cargo board in specific state while the seat is in an unfolded state.

According to this embodiment, a front end of the cargo board can be easily held at an appropriate height that makes an appropriate inclination angle from the top surface of the cargo board to the opening. Further, the seat back may prevent the dripping-wet personal effects from being placed on the cargo board with a part protruding frontward from the cargo board. Therefore, the seat back can prevent the floor from getting dripping-wet due to water drops from the dripping-wet personal effects protruding forward of the cargo board.

In a preferable embodiment, the seat may be capable of being folded into a folded state with the seat back folded frontward on a seat cushion of the seat, and the board holder may be capable of holding the cargo board in the specific state even while the seat is in the folded state.

According to this embodiment, utility of the seat for an occupant may be enhanced, because the seat can be folded into the folded state. Further, the space for placing the dripping-wet personal effects can be enlarged frontward of the trunk box, independently of the folding state of the seat (i.e., whether in the folded state or in the unfolded state).

In a preferable embodiment, the cargo board that is held in the specific state while the seat is in the folded state may be disposed frontward of that while the seat is in the unfolded state.

According to this embodiment, the space for placing the dripping-wet personal effects can be enlarged frontward without being limited by the existence of the seat.

In a preferable embodiment, a board holder may be provided on both left and right side walls of the cargo compartment instead of being provided on the backside of the seat back.

According to this embodiment, the board holder may not be disposed on a top surface of the floor of the cargo compartment and also may not be disposed on a top surface of the seat that is in the folded state (i.e., backside of the seat back). Therefore, a degree of freedom for storing personal effects in the cargo compartment can be enhanced, in the case of storing the dry personal effects in the cargo compartment while the cargo board is in the closed position.

In a preferable embodiment, the board holder may comprise a placing surface on which the cargo board is placed, where the placing surface may be formed on the side walls and may be downwardly inclined toward the rear side of the automobile. The placing surface may comprise a groove extending in a longitudinal direction of the automobile.

According to this embodiment, even though water drops enter between a side wall of the cargo board and a side wall of the cargo compartment, the water drops may flow rearward in the groove formed on the placing surface. Therefore, the water drops in the groove will flow into the trunk box in the same way as the water drops flow on the cargo board. As a result, it can prevent the floor of the cargo compartment from getting dripping-wet due to the water drops that entered between the side wall of the cargo board and the side wall of the cargo compartment. Further, the top surface of the cargo board can be easily inclined downwardly toward the rear side of the automobile, by placing the cargo board on the placing surface.

In a preferable embodiment, the cargo board may comprise a wall projecting upward from the top surface of the cargo board that is held in the specific state, wherein the wall may be formed along a front edge and both left and right edges of the cargo board that is held in the specific state.

According to this embodiment, even though the water drops flow frontward or laterally on the cargo board due to front or lateral force of inertia during decelerating or curve traveling of the automobile, the wall can prevent the water drops from spilling out of the cargo board. Further, the wall can prevent the water drops from spilling frontward and laterally out of the cargo board, even though the automobile is parked on a frontward inclined road (i.e., downward slope) or a laterally inclined road (i.e., one-way grade). Furthermore, the wall can prevent the personal effects from being placed on the cargo board with a part protruding from the cargo board, when the personal effects are loaded on the cargo board.

In a preferable embodiment, a rib and/or a groove extending in a longitudinal direction of the automobile may be formed on the top surface of the cargo board that is held in the specific state.

According to this embodiment, the cargo board may ensure enough rigidity to hold the heavy personal effects that contain much water, while maintaining a reduced weight of the cargo board. Further, the water drops from the dripping-wet personal effects can be effectively guided into the trunk box, as the rib or the groove extends in the longitudinal direction of the automobile.

In a preferable embodiment, the cargo board may be configured to be selectively placed directly on a floor of the cargo compartment instead of being held in the specific state by the board holder, while the cargo board is in the open position.

According to this embodiment, the top surface of the cargo board can be made horizontal by placing the cargo board directly on the floor of the cargo compartment while the cargo board is in the open position. In this case, the space for storing the personal effects in the cargo compartment can be larger than that in the case where the board holder holds the cargo board in the specific state. Therefore, a degree of freedom for storing personal effects in the cargo compartment can be enhanced, for example, in the case of storing dry personal effects in the cargo compartment.

As described above, according to the invention, the cargo compartment structure for the automobile comprises a board holder for holding the cargo board in the specific state such that the top surface of the cargo board is downwardly inclined toward the rear side of the automobile and so that the rear end of the cargo board is disposed rearward of the front end of the trunk box while the cargo board is in the open position. Therefore, the dripping-wet personal effects can be stored in the cargo compartment so as not to get the floor dripping-wet by enlarging the space for placing the dripping-wet personal effects frontward of the trunk box, even in the case where there are many dripping-wet personal effects to be stored and/or in the case that the size of the dripping-wet personal effects is larger than that of the trunk box.

DETAILED DESCRIPTION

Hereinafter, several embodiments of the invention are explained in detail based on the appended drawings. Note that description of the following embodiments is merely illustrative essentially, and does not intend to limit the invention, its applications and/or its use.

Embodiment 1

Figure 1:
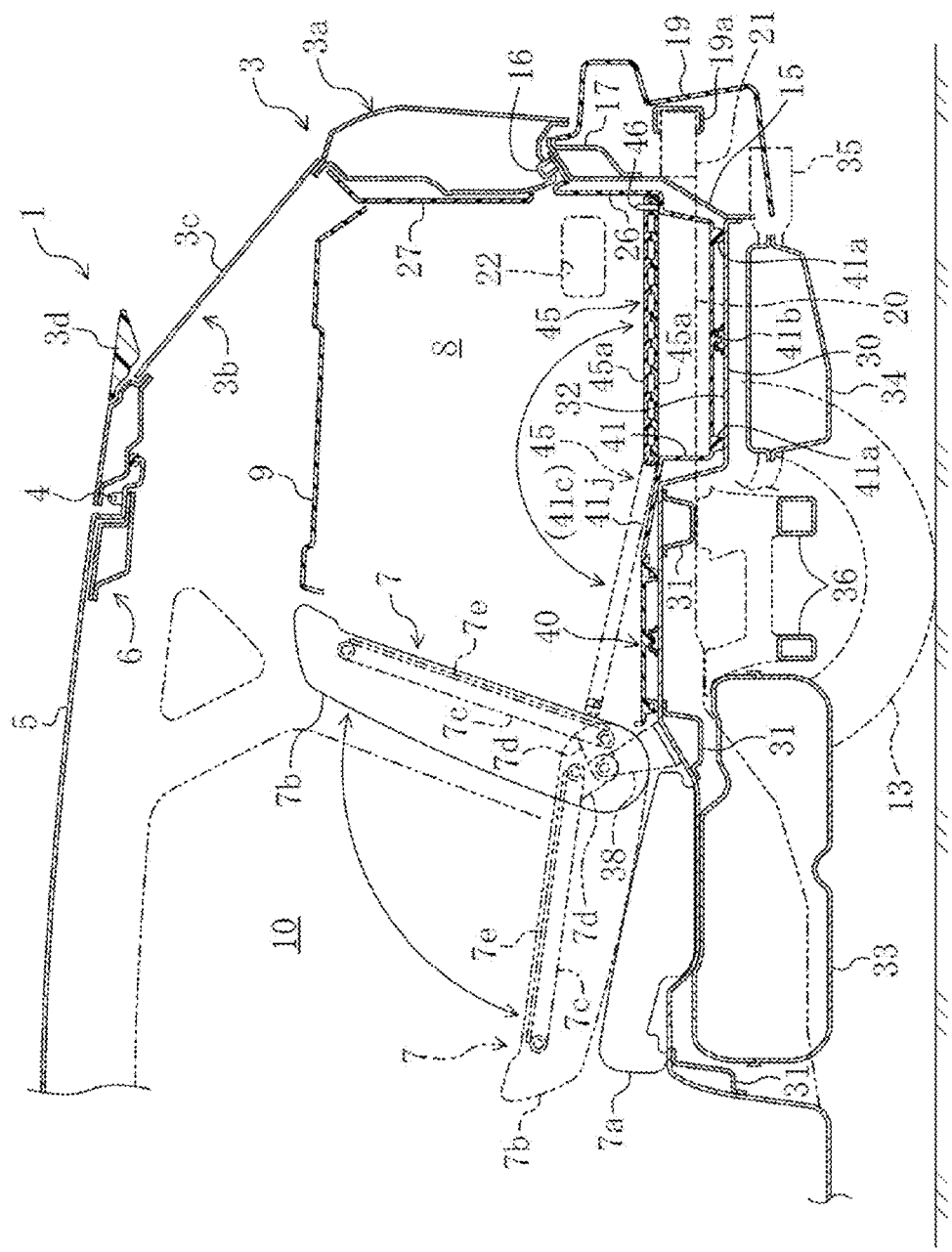
FIG. 1 is a schematic cross-sectional view showing a rear part of an automobile to which a cargo compartment structure according to Embodiment 1 of the invention is applied.

FIG. 1 shows a rear part of an automobile 1 to which a cargo compartment structure according to Embodiment 1 of the invention is applied. The automobile 1 is of a hatchback-type, and is provided with a liftgate 3 that closes an opening part 2 (refer to FIG. 2) in a rear face of the automobile 1. The liftgate 3 is rotatably supported at an upper end part thereof around a hinge shaft 4. The hinge shaft 4 is provided to a part corresponding to a rear end part of a rear header 6 which is located in a rear end part of a roof panel 5. Thus, the liftgate 3 opens and closes the opening part 2 by its rotation around the hinge shaft 4. The liftgate 3 includes a body part 3a having a window opening 3b in its upper part, a window glass 3c provided to the window opening 3b, and a rear spoiler 3d provided to an upper edge of the window opening 3b.

The automobile 1 to which the invention is applied may be any type of automobile as long as it is provided with a cargo compartment without limiting to the hatchback type described above. Herein, the terms "front," "rear," "left," and "right" are substantially the front, rear, left, and right of the automobile 1, respectively.

A rear cargo area or rear cargo compartment 8 is arranged behind a rear seat 7 which is located in a rear part of the automobile 1. By opening the liftgate 3, the rear cargo area 8 is opened rearward via the opening part 2, and then loading and unloading of articles are allowed to/from the rear cargo area 8 via the opening part 2. A cargo cover 9 (illustrated only in FIG. 1) for partitioning between the rear cargo area 8 and a vehicle cabin 10 is arranged above the rear cargo area 8. Both of left and right end parts of the cargo cover 9 are placed on and fixed to step parts 25a (refer to FIG. 3) formed in upper parts of left and right cargo compartment side trim panels 25 described later, respectively.

Figure 2:
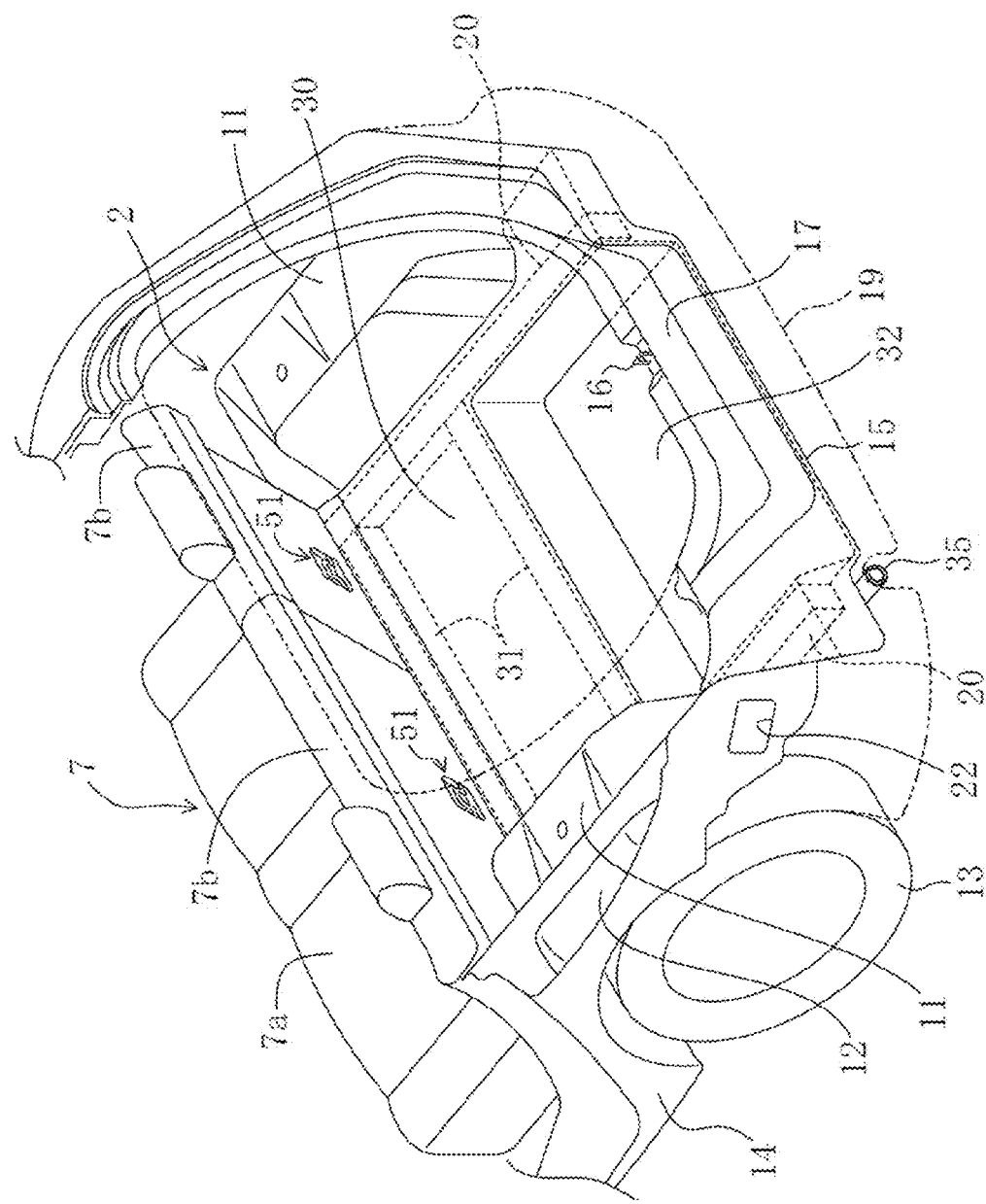
FIG. 2 is a perspective view showing a vehicle body configuration of the rear part of the automobile.

As shown in FIG. 2, both left and right side walls of the rear cargo area 8 are constituted with left and right inner wheel well panels 11 (each including the cargo compartment side trim panel 25 described in detail later), respectively. Each inner wheel well panel 11 constitutes a wheel well of a rear wheel 13 together with an outer wheel well panel 12 arranged outwardly in the vehicle width direction. The outside of each outer wheel well panel 12 in the vehicle width direction is covered by a side outer panel 14 that constitutes a side part of the body of the automobile 1, and a part of the side outer panel 14 corresponding to the wheel well and a lower end part of the outer wheel well panel 12 are coupled to each other.

A lower part of a rear wall of the rear cargo area 8 is configured by a rear cargo inner panel 15 (refer to FIGS. 1 and 2). An upper end of the rear cargo inner panel 15 is used as a lower edge of the opening part 2, and has a latch striker 16 for engaging with a latch mechanism (not illustrated) provided to a lower end part of the body part 3a of the liftgate 3. The upper end of the rear cargo inner panel 15 and its vicinity parts are reinforced by a rear cargo outer panel 17. The upper part of the rear wall of the rear cargo area 8 is configured by a part of the body part 3a of the liftgate 3 below the window opening 3b.

A rear bumper 19 is arranged behind the rear cargo inner panel 15. A reinforcement 19a (illustrated only in FIG. 1) of the rear bumper 19 is fixed to left and right rear side frame rails 20 (refer to FIGS. 1 and 2) via a bumper crush beam 21 (illustrated only in FIG. 1) provided to the rear end of each rear side frame rail 20.

In a lower part of a rear end part of the left outer panel 14 (a part covered by the left end part of the rear bumper 19), a vent hole 22 (refer to FIGS. 1 and 2) is formed, into which an extractor (an interior pressure release vent) for discharging air inside the cabin 10 and the rear cargo area 8 out of the automobile is attached. The extractor vent hole 22 communicates with the rear cargo area 8 and, thus, the extractor can be arranged in the rear cargo area 8. Although detailed explanation and illustration of the configuration of the extractor are omitted, it typically includes a cutoff valve having a flexible seat member. The cutoff valve permits air to be discharged from inside of the automobile to the outside of the automobile via the extractor vent hole 22, and is configured in a one-way structure (check valve) for inhibiting a flow of the air from the outside of the automobile into the automobile.

Figure 3:
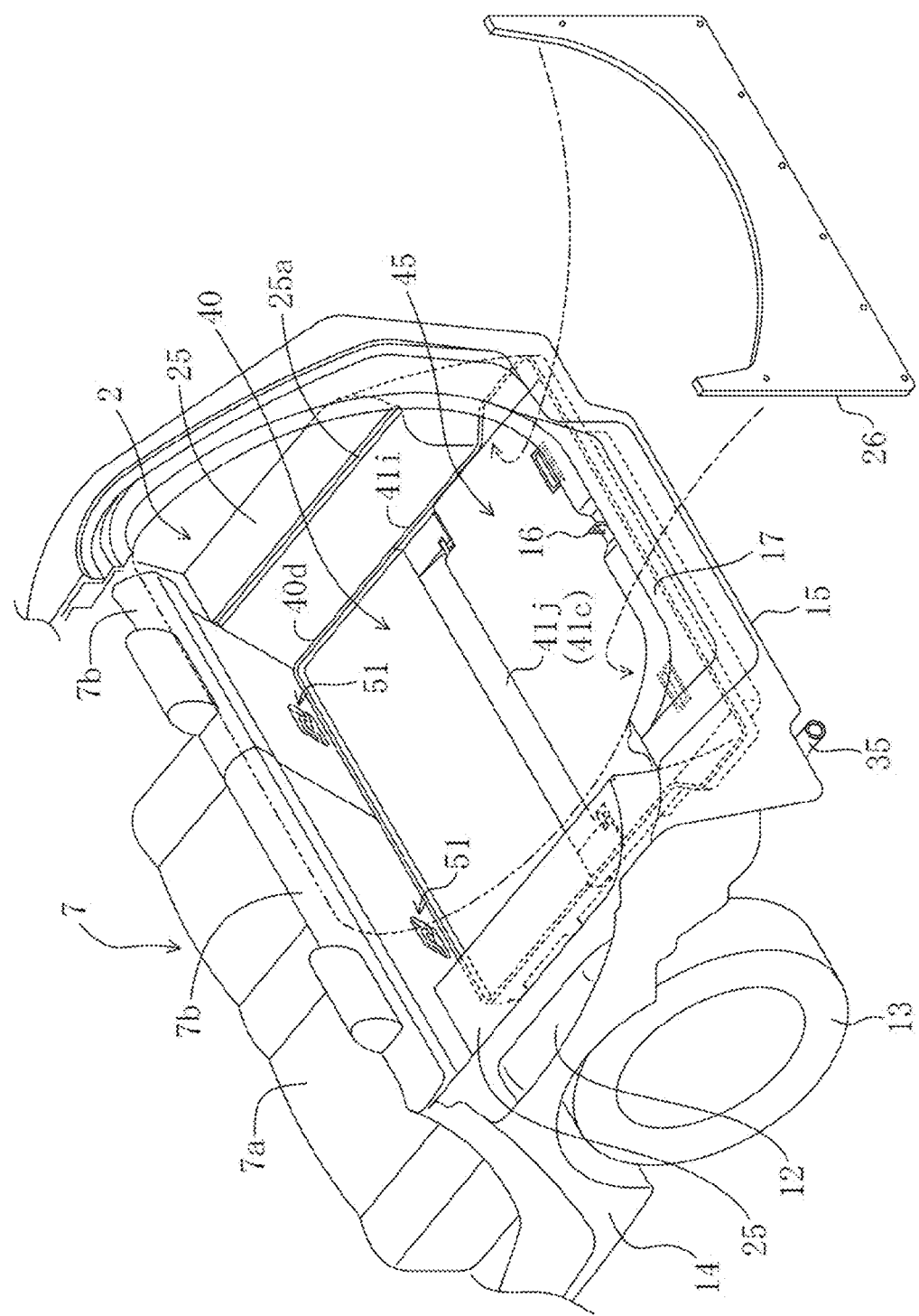
FIG. 3 is a perspective view showing a state in which a reversible cargo board is positioned at a closed position in the cargo compartment of the automobile.

As shown in FIG. 3, a cargo compartment side trim panel 25 is attached inside of each inner wheel well panel 11 in the vehicle width direction (on the side of the rear cargo area 8), for covering the inner wheel well panel 11. The cargo compartment side trim panel 25 covers the extractor vent hole 22, but allows a flow of the air from the rear cargo compartment 8 to the extractor vent hole 22. A rear cargo area back trim panel 26 (refer to FIGS. 1 and 3) is attached to the front of the rear cargo inner panel 15 (on the side of the rear cargo area 8), for covering the rear cargo inner panel 15. A liftgate trim panel 27 (refer to FIG. 1) is attached to the front (on the side of the rear cargo area 8) of a part of the body part 3a of the liftgate 3 below the window opening 3b, for covering the part concerned. Note that, in FIG. 2, illustration of the liftgate 3, the cargo compartment side trim panels 25, a trunk box 41 (described below), a reversible cargo board 45 (described below) and the like is omitted. In addition, in FIG. 3, illustration of the liftgate 3, the rear bumper 19 and the like is omitted.

A floor panel 30 that constitutes a floor of the rear cargo area 8 is fixed to an upper face of the left and right rear side frame rails 20. Cross members 31 extending in the vehicle width direction are fixed to a part of a lower face of the floor panel 30 corresponding to a front end part and a lower end part of the rear seat 7 and a central part of the rear cargo area 8 in the front-and-rear direction, respectively. Both ends of the cross members 31 are fixed to the left and right rear side frame rails 20, respectively. A part of a rear end part of the floor panel 30, which is surrounded by the left and right rear side frame rails 20 and the rearmost cross member 31, is concaved downwardly, and configures a rear cargo floor panel 32 of substantially a rectangular shape in a plan view, together with the rear cargo inner panel 15. The floor panel 30 does not need to be constituted with a single plate member, and may include two or more plate members. Particularly, the part that constitutes the rear cargo floor panel 32 may be constituted with a different plate member from other parts.

A fuel tank 33 having a structure in which the tank is divided into two parts in the vertical direction is arranged in a part below the floor panel 30 corresponding to the rear seat 7, and a silencer 34 having a structure in which the silencer is divided into two parts in the vertical direction, which is provided to a rear part of an exhaust pipe, is arranged in a part corresponding to the rear cargo floor panel 32. A tail pipe 35 of the exhaust pipe is connected to the silencer 34. Two subframes 36 for supporting non-illustrated rear wheel suspensions (E-type multi-link suspensions) are arranged in series in the front-and-rear direction so as to extend in the vehicle width direction, in a part below the floor panel 30 between the fuel tank 33 and the silencer 34. Both ends of the subframes 36 are fastened and fixed to the left and right rear side frame rails 20 with bolts, respectively.

The rear seat 7 has a seat cushion 7a fixed to an upper face of the floor panel 30, and two seat backs 7b provided so as to be arranged in the vehicle width direction behind the seat cushion 7a. Each seat back 7b is rotatably supported by a support bracket 38 provided behind and both left and right of the seat cushion 7a on the upper face of the floor panel 30. In other words, support members 7d fixed to a lower part of both left and right parts of a seat back frame 7c provided over the entire periphery part inside each seat back 7b are rotatably coupled to an upper end part of the left and right support brackets 38, respectively. When the rear seat 7 is in use (unfolded), the seat back 7b is in a state in which it stands up so as to extend in the vertical direction. Then, the seat back 7b is leaned forward toward the seat cushion 7a so that a seat-back face of the seat back 7b contacts a seating face of the seat cushion 7a, which makes the rear seat 7 to a folded state from the unfolded state (shown by two-dot chain lines in FIG. 1).

A rear cargo floor board 40 made of a resin (for example, polypropylene) is arranged in a front part of the upper face of the floor panel 30 in the rear cargo area 8. As shown enlarged in FIG. 4, leg parts 40a that project downwardly and extend in the left-and-right direction such that they contact the upper face of the floor panel 30 are formed in both front-and-rear end parts on a lower face of the rear cargo floor board 40, respectively. A plurality of grommet parts 40b (as shown in FIG. 5, three in this embodiment) are provided in a central part on the lower face of the rear cargo floor board 40 in the front-and-rear direction. Further, two or more engaging members 43 are arranged on the upper face of the floor panel 30 so as to project upwardly from the upper face of the floor panel 30, corresponding to the plurality of grommet parts 40b, respectively. A through-hole 43a for engaging with each grommet part 40b which is inserted therein is formed in each engaging member 43, and by such engagement, the rear cargo floor board 40 can be fixed to the upper face of the floor panel 30.

As also shown in FIG. 5, a step part 40c concaved downwardly is provided in a rear end part on the upper face of the rear cargo floor board 40. A projected part 40d projecting slightly upward is formed in a front end part and both left and right end parts on the upper face of the rear cargo floor board 40. Parts other than the front, rear, left, and right end parts on the upper face of the rear cargo floor board 40 (hereinafter, referred to as the "upper face of the rear cargo floor board 40") are configured with a hair-implanted part 40e (refer to FIG. 4) to which non-waterproofed hairs are implanted, and in this embodiment, this upper face of the rear cargo floor board 40 substantially serves as a floor of the rear cargo area 8.

As shown in FIGS. 1 and 5, a trunk box 41 (i.e., storage box) made of a resin (for example, polypropylene) having an opening on the upper side is arranged in a rear part on the upper face of the floor panel 30 in the rear cargo area 8. The trunk box 41 is formed substantially in a rectangular shape in a plan view similar to the rear cargo floor panel 32, and is inserted into the rear cargo floor panel 32.

Leg parts 41a similar to those of the rear cargo floor board 40, which contact a bottom face of the rear cargo floor panel 32, are formed in both front and rear ends on the lower face of the trunk box 41, respectively. A plurality of grommet parts 41b (in FIG. 5, three in this embodiment) similar to those of the rear cargo floor board 40 are provided in an intermediate part on the lower face of the trunk box 41 in the front-and-rear direction.

A flange part projecting substantially in the horizontal direction is formed in the entire periphery part of the opening of the trunk box 41. In the flange part, a front part of the opening is called "front flange part 41c," a left part is called "left flange part 41d," a right part is called "right flange part 41e," and a rear part is called "rear flange part 41f." The left flange part 41d extends to the left side from the front flange part 41c and the rear flange part 41f, and is connected with the front flange part 41c and the rear flange part 41f. A left extension part 41g projecting further to the left is formed in a rear part of the left flange part 41d such that it conforms to the shape of the left cargo compartment side trim panel 25. The right flange part 41e extends to the right side from the front flange part 41c and the rear flange part 41f, and is connected with the front flange part 41c and the rear flange part 41f. A right extension part 41h projecting further to the right is formed in a rear part of the right flange part 41e such that it conforms to the shape of the right cargo compartment side trim panel 25.

A projected part 41i projecting upward is continuously formed in a left end part of the left flange part 41d, a right end part of the right flange part 41e, and a rear end part of the rear flange part 41f. An upper face of the projected part 41i positions substantially at the same height as the upper face of the projected part 40d of the rear cargo floor board 40.

Figure 4:
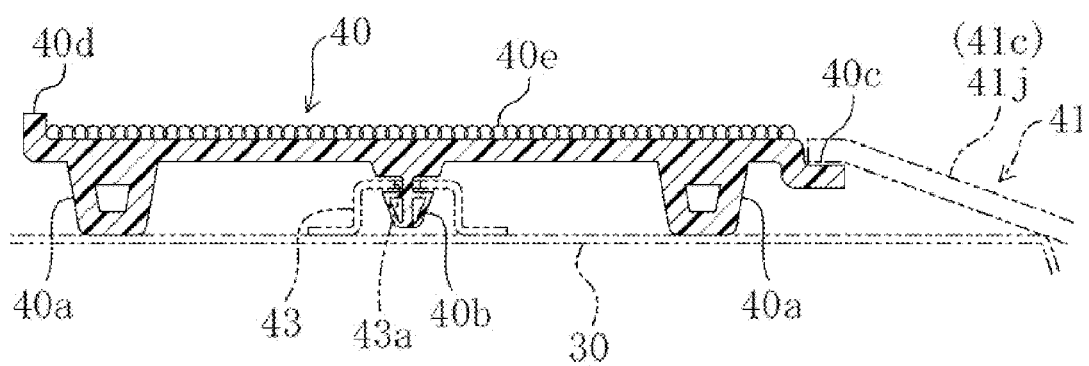
FIG. 4 is an enlarged cross-sectional view showing a rear cargo floor board, cut in the front-and-rear direction.
Figure 5:
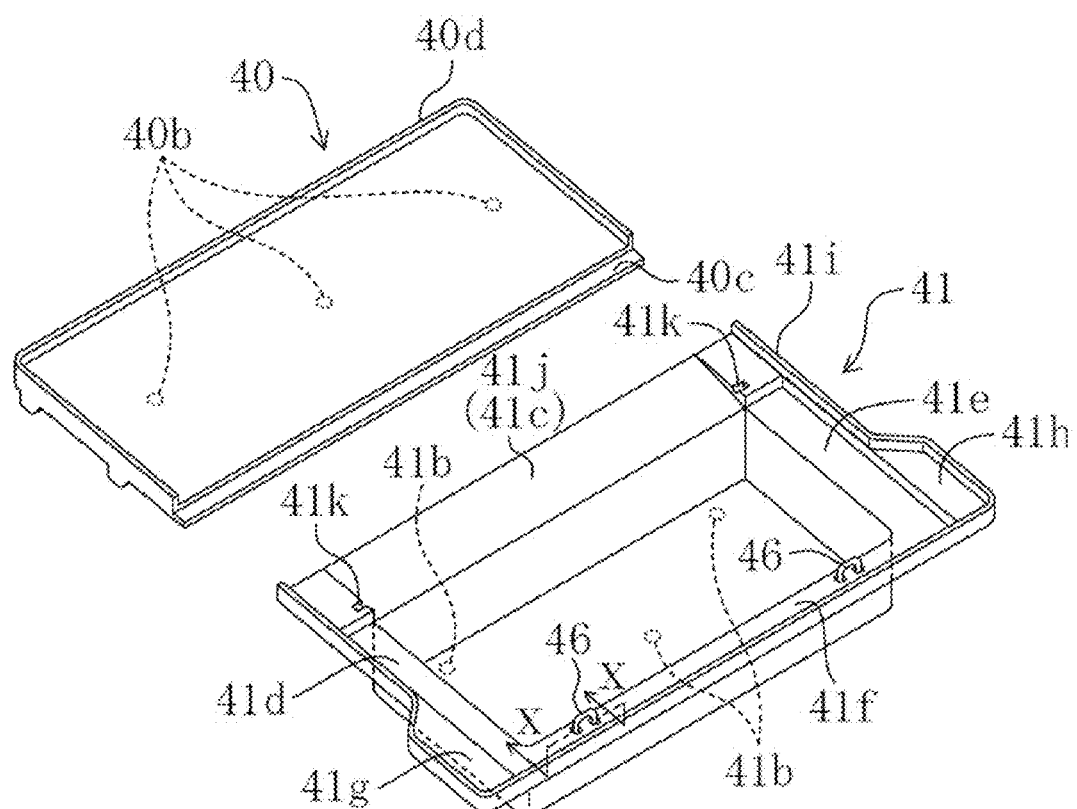
FIG. 5 is a perspective view showing the rear cargo floor board and the trunk box.
Figure 6:
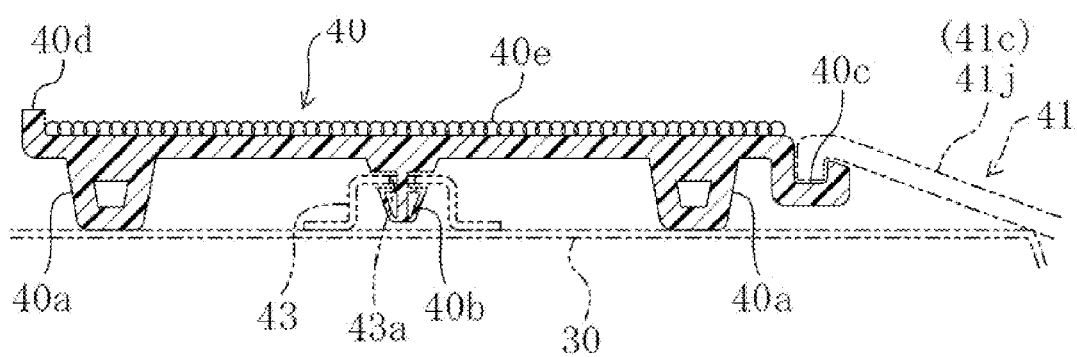
FIG. 6 is a view corresponding to FIG. 4, showing a modified example of a connection between the rear cargo floor board and a front flange part of the trunk box.

As shown by two-dot chain lines in FIG. 4, a front end part of the front flange part 41c locates on the step part 40c of the rear cargo floor board 40, and is connected to a rear end part of the rear cargo floor board 40 so that a level difference does not occur between the trunk box 41 and the rear cargo floor board 40. Note that, alternatively, as shown in FIG. 6, the step part 40c of the rear cargo floor board 40 and the front end part of the front flange part 41c may be formed in shapes so that they engage with each other, which avoid the trunk box 41 and the rear cargo floor board 40 from shifting forward and rearward mutually.

In the left flange part 41d, although the upper faces of a front edge part (a left-side side part of the front flange part 41c) and the left extension part 41g position at substantially the same height as the upper face of the rear cargo floor board 40, upper faces of other parts locate below the upper face of the rear cargo floor board 40 by a thickness of the reversible cargo board 45. Moreover, in the right flange part 41e, although the upper faces of a front edge part (a right-side side part of the front flange part 41c) and the right extension part 41h position at substantially the same height as the upper face of the rear cargo floor board 40, upper faces of other parts locate below the upper face of the rear cargo floor board 40 by the thickness of the reversible cargo board 45. Further, the upper face of the rear flange part 41*f* also positions below the upper face of the rear cargo floor board 40 by the thickness of the reversible cargo board 45. The parts below the upper face of the rear cargo floor board 40 are substantially horizontal similar to the upper face of the rear cargo floor board 40.

On the other hand, the upper face of the front flange part 41*c* serves as a slope face part 41*j* that inclines so that it lowers gradually rearwardly from substantially the same height as the upper face of the rear cargo floor board 40, and the rear end of the slope face part 41*j* serves as a front edge of the trunk box opening.

An inner face of the trunk box 41 and the upper faces of the flange parts 41*c*-41*f* are applied with a waterproof treatment so that dripping-wet loads (swimwear, marine sports products, etc.) can be accommodated in the trunk box 41.

Figure 7:
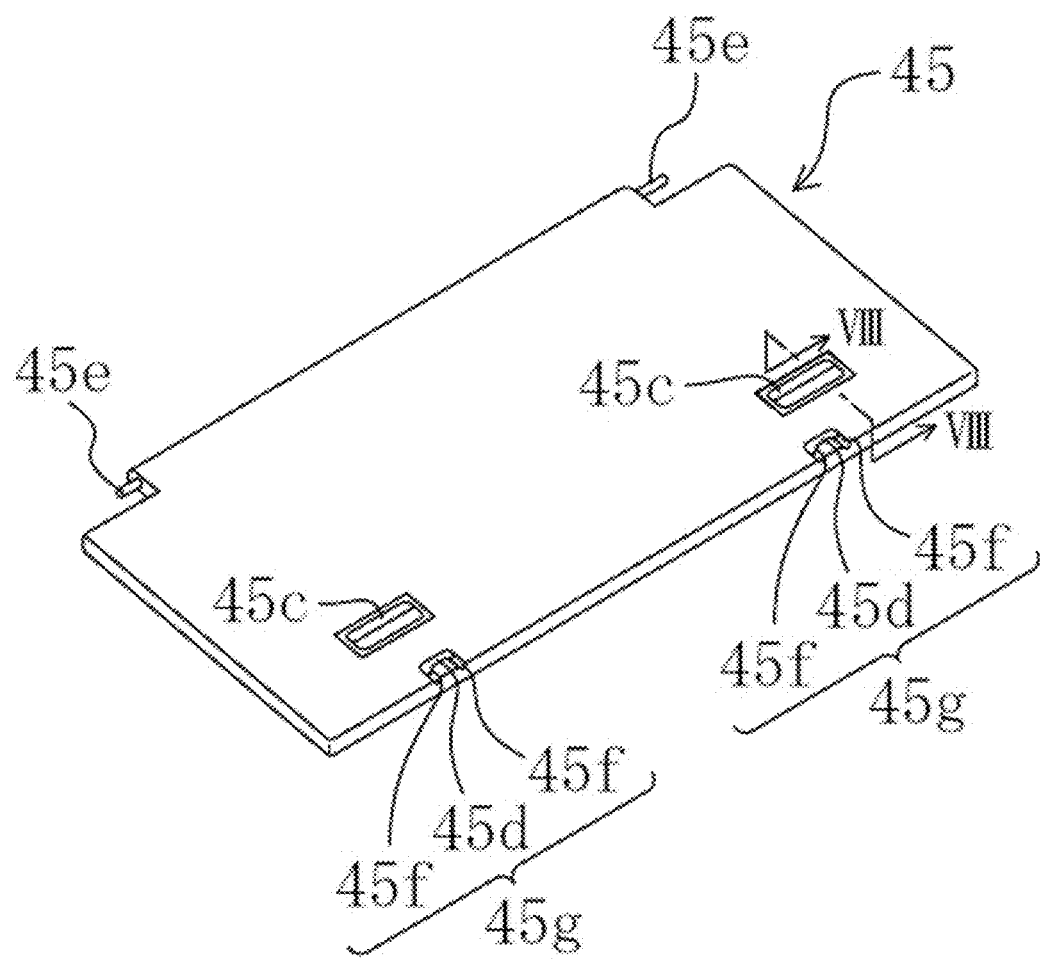
FIG. 7 is a perspective view showing the reversible cargo board.

The opening of the trunk box 41 is covered by a reversible cargo board 45 made of a resin (for example, polypropylene) as shown in FIG. 7. The reversible cargo board 45 is configured so that its installation position can be changeable between a closed position (refer to FIGS. 1 and 3) at which the opening is covered and an open position at which the opening is opened by positioning forward of the closed position in the rear cargo area 8 as shown by two-dot chain lines in FIG. 1. When the reversible cargo board 45 is positioned at the closed position, parts of the left flange part 41*d*, the right flange part 41*e*, and the rear flange part 41*f* below the upper face of the rear cargo floor board 40 are also covered by the reversible cargo board 45, and the upper face of the reversible cargo board 45 at this time locates at substantially the same height as the upper face of the rear cargo floor board 40 (refer to FIG. 3).

Figure 8:
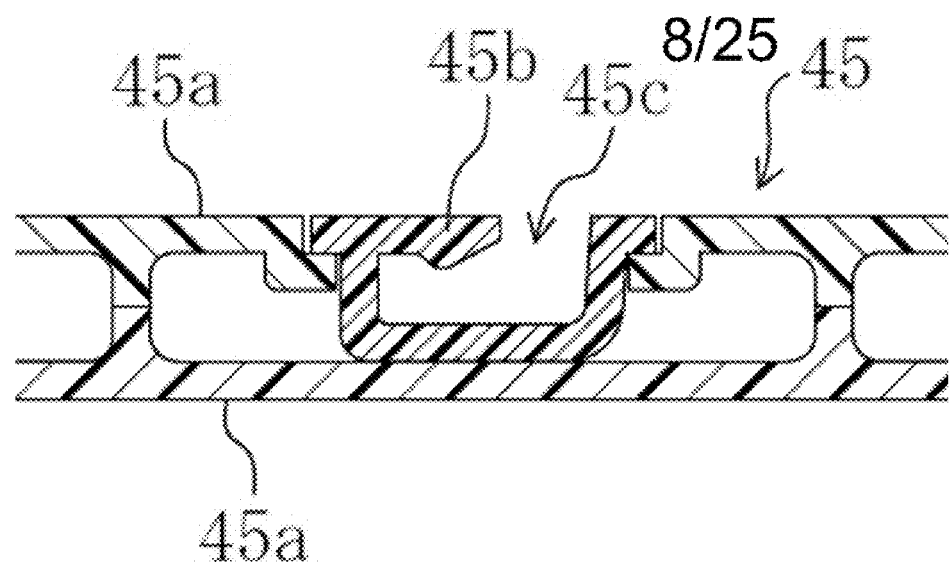
FIG. 8 is a cross-sectional view taken along a line VIII-VIII of FIG. 7.
Figure 9:
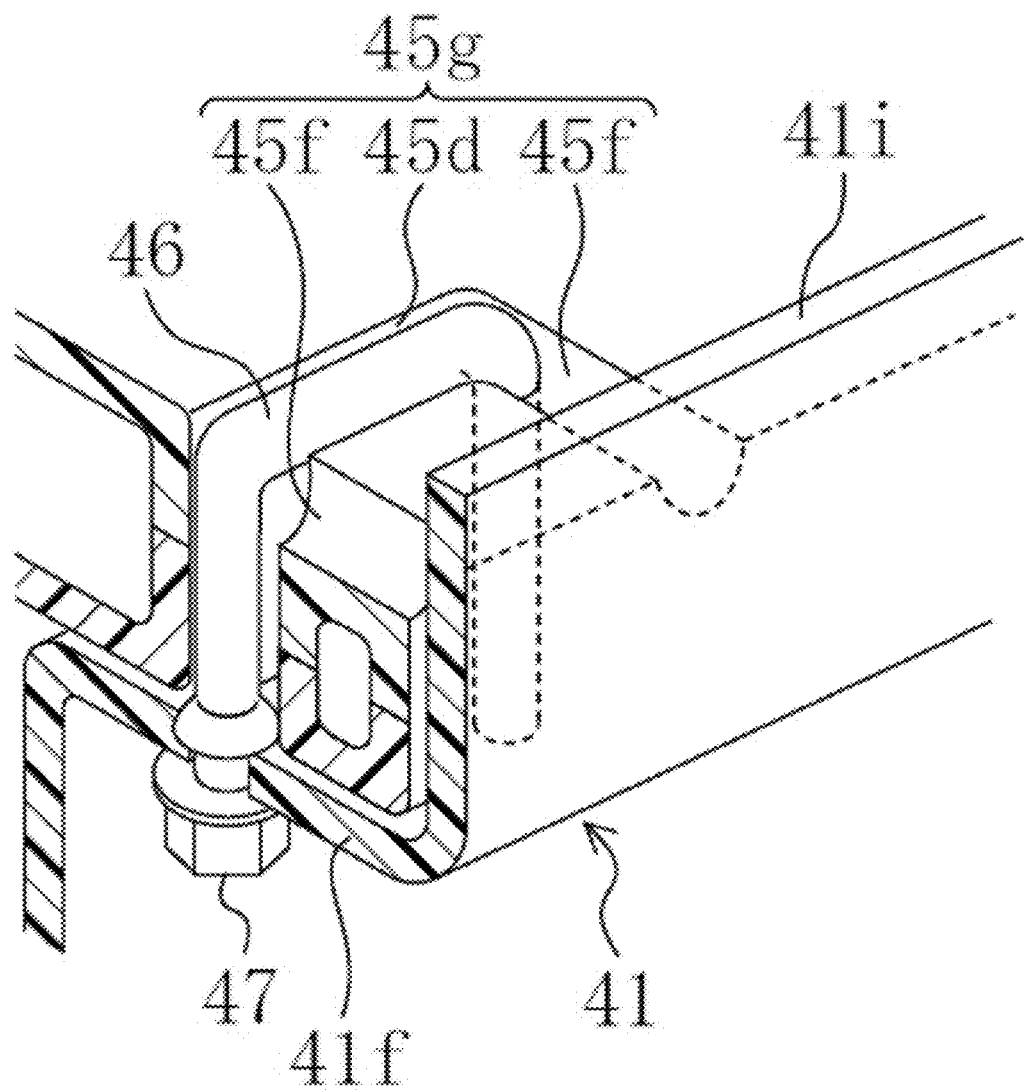
FIG. 9 is a partially-cross-sectioned, perspective view showing an engagement state between an engaging hook and elongate holes of the reversible cargo board.
Figure 10:
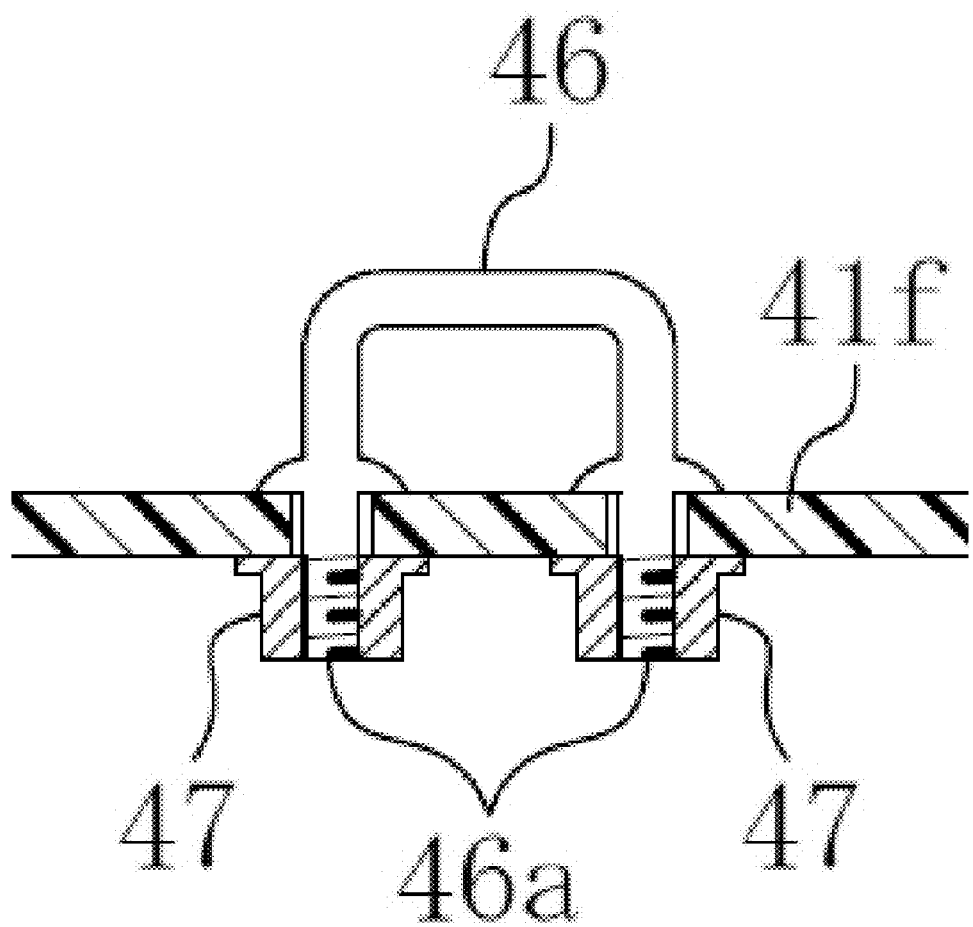
FIG. 10 is a cross-sectional view taken along a line X-X of FIG. 5.

The reversible cargo board 45 is formed by stacking two plate members 45*a* one on the other in the vertical direction (refer to FIGS. 1 and 8). Members 45*b* other than the members 45*a* are embedded (refer to FIG. 8) in a rear part (left and right, two positions, as shown in FIG. 7) on the upper face of the reversible cargo board 45 positioned at the closed position, and by the members 45*b*, finger-hooking parts 45*c* by which an operator of the automobile 1 hooks his/her fingers to lift the rear part of the reversible cargo board 45 are configured. Elongate holes 45*d* that penetrate a rear end part (left and right, two positions) of the reversible cargo board 45 in the vertical direction and are elongated in the horizontal direction are provided to the rear end part of the reversible cargo board 45. As shown in FIG. 9, an engaging hook 46 of an inverted U-shape fixed to the rear flange part 41*f* is inserted in each of the elongate holes 45*d* when the reversible cargo board 45 is positioned at the closed position, so that the engaging hooks 46 and the elongate holes 45*d* engage with each other. As shown in FIG. 10, each engaging hook 46 is fixed to the rear flange part 41*f* so as to project upwardly by threadedly engaging with two nuts 47 having male threaded parts 46*a* formed on both ends of the engaging hook 46, respectively. Because of frictional forces between the engaging hooks 46 inserted in the elongate holes 45*d* and inner circumferential faces of the elongate holes 45*d*, even if vibration at the time of traveling of the automobile 1 occurs, the engagement state between the engaging hooks 46 and the elongate holes 45*d* is maintained and, thus, the reversible cargo board 45 does not rise. However, when the operator hooks his/her fingers on the finger-hooking parts 45*c* and lifts the rear part of the reversible cargo board 45, the engagement can be released with a small force to lift the reversible cargo board 45.

Figure 11:
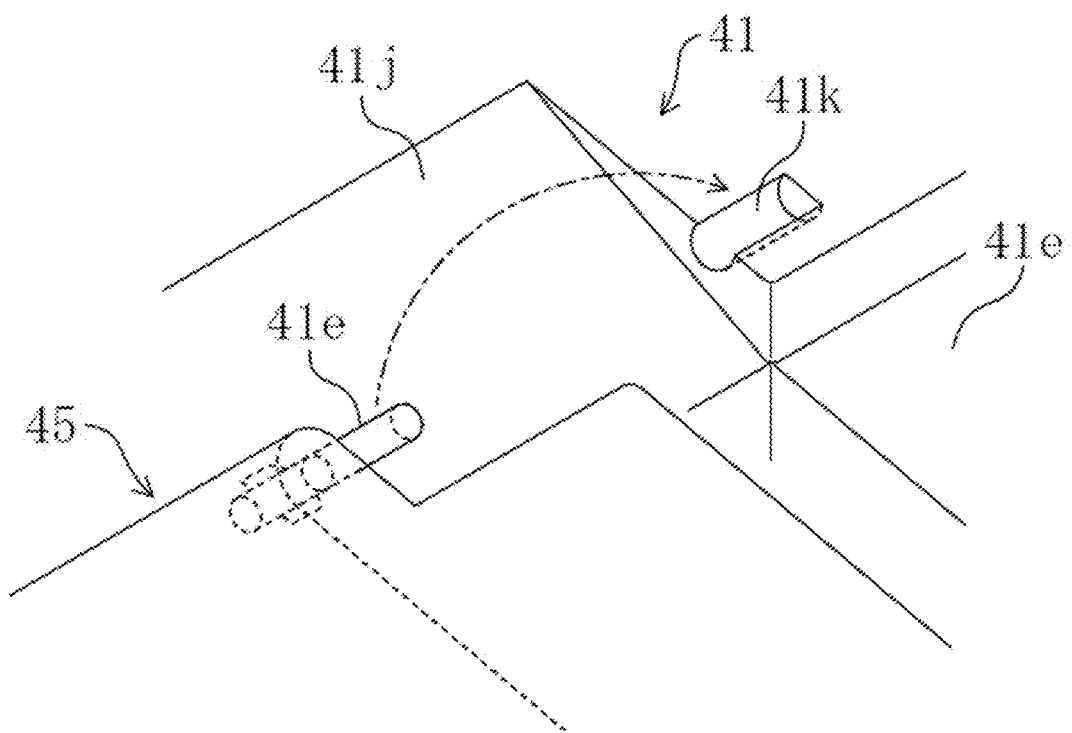
FIG. 11 is a perspective view showing a hinge shaft and a bearing part of the reversible cargo board in detail.

As shown in FIG. 7, a front end part of the reversible cargo board 45, a length of which in the horizontal direction is shorter than other parts thereof, and hinge shafts 45*e* are provided to end faces on both left-and-right-side side faces of the front end part. As shown in FIG. 11, each hinge shaft 45*e* fits into a bearing part 41*k* of a groove shape provided in front edge parts of the left and right flange parts 41*d* and 41*e*, respectively. When moving the reversible cargo board 45 to the open position from the closed position, it is rotated around the hinge shafts 45*e* fitted in the bearing parts 41*k*. By this rotation, the rear end of the reversible cargo board 45 positioned at the closed position is thus moved to a rear face of the seat back 7*b* of the rear seat 7 (refer to FIG. 1). In this way, in the open position, the reversible cargo board 45 is positioned in a state in which it is upside down from the closed position.

The reversible cargo board 45 positioned at the open position is held in a specific state in which, by board holders 51 provided in the rear face of the seat back 7*b* of the rear seat 7, the upper face (originally, the bottom face) of the reversible cargo board 45 inclines downwardly toward the rear and the rear end of the reversible cargo board 45 locates behind the front end of the trunk box 41 (the front end of the slope face part 41*j*).

Figure 12:
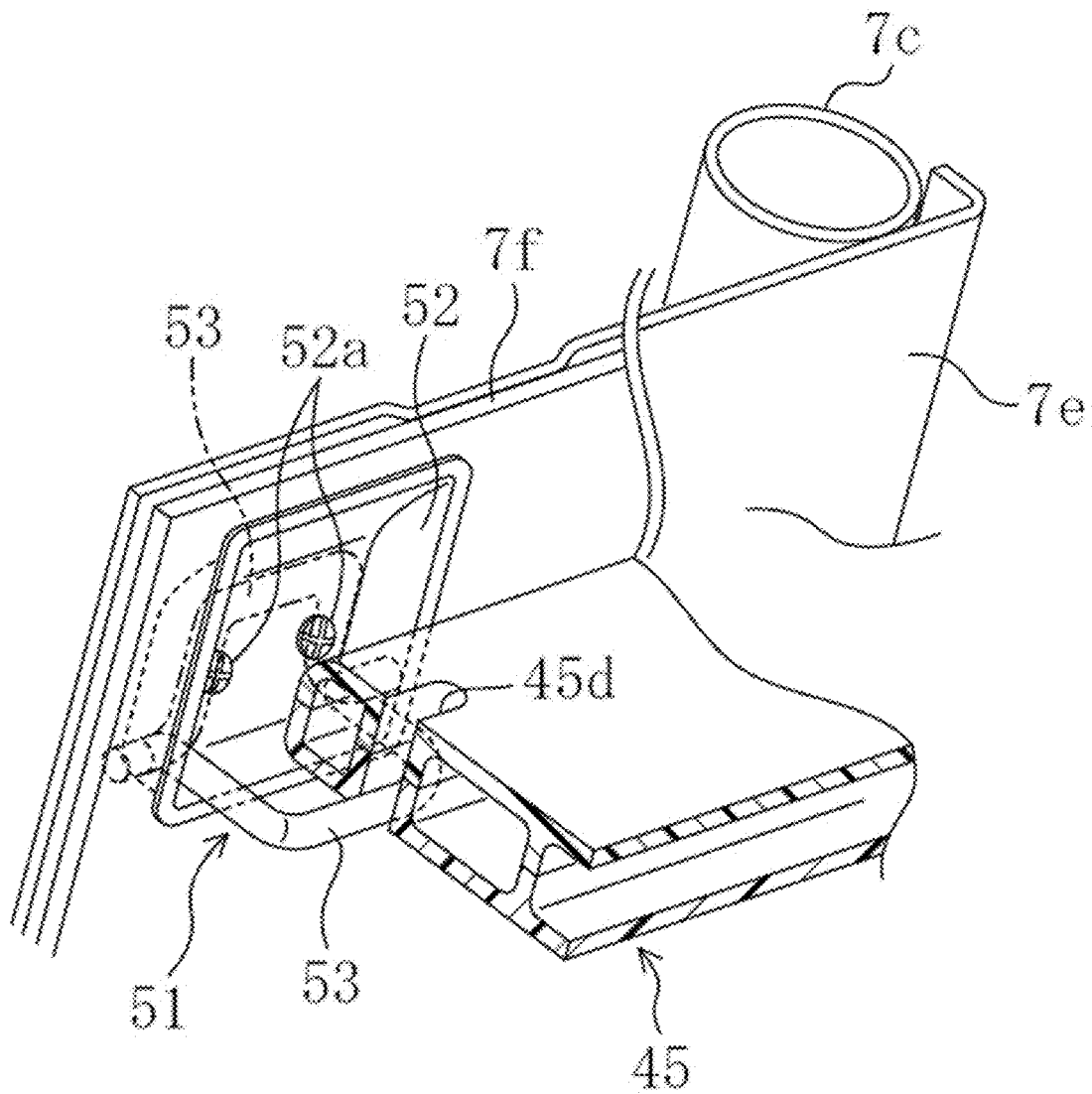
FIG. 12 is a perspective view showing an engagement state between a board holding hook of a board holder and an engaging concave part of the reversible cargo board (a cross-sectional perspective view for the reversible cargo board).

Particularly, as shown in FIG. 12, a rear seat back panel 7*e* is provided in the proximity of the rear face of each seat back 7*b* (immediately inside the outermost covering) over substantially the entire rear face. The rear seat back panel 7*e* is typically made of iron, and is fixed to both left-and-right-side side parts of the seat back frame 7*c*. A retractable hook bezel 52, which is concaved into the seat back 7*b* (to the front in use of the rear seat 7), is fixed to a lower part of the rear seat back panel 7*e* of each seat back 7*b* with screws 52*a* from the outside (rear side) of the seat outermost covering 7*f*. A board holding hook 53, which is formed by bending a bar member of a circular cross-section into substantially a U-shape, is rotatably attached to a lower end part of each retractable hook bezel 52. Each board holding hook 53 can be switched between a state in which it is accommodated in the retractable hook bezel 52 (shown by two-dot chain lines in FIG. 12) and a state in which it projects rearward when the outside of the seat back 7*b* is in use (rear side when the rear seat 7 is in use (i.e., on the side of the rear cargo area 8)). In this state in which the board holding hook 53 projects, it contacts a lower face of the retractable hook bezel 52 so that it cannot move further downwardly. In this embodiment, the retractable hook bezel 52 and the board holding hook 53 constitute each board holder 51. Note that, alternatively, the board holding hook 53 may be fixed in the projected state so that it cannot be switched to the state in which it is accommodated in the retractable hook bezel 52.

On the other hand, as shown in FIGS. 7 and 9, an engagement groove 45*f* is formed in a part of the upper face of the reversible cargo board 45 when positioned at the closed position, from both ends of each elongate hole 45*d* to the rear end of the reversible cargo board 45. A part combining the engagement groove 45*f* and the elongate hole 45*d* is formed in the same shape as the projected part of the board holding hook 53, and constitutes an engaging concave part 45*g* into/with which each projected board holding hook 53 fits and engages in the open position of the reversible cargo board 45.

Figure 13:
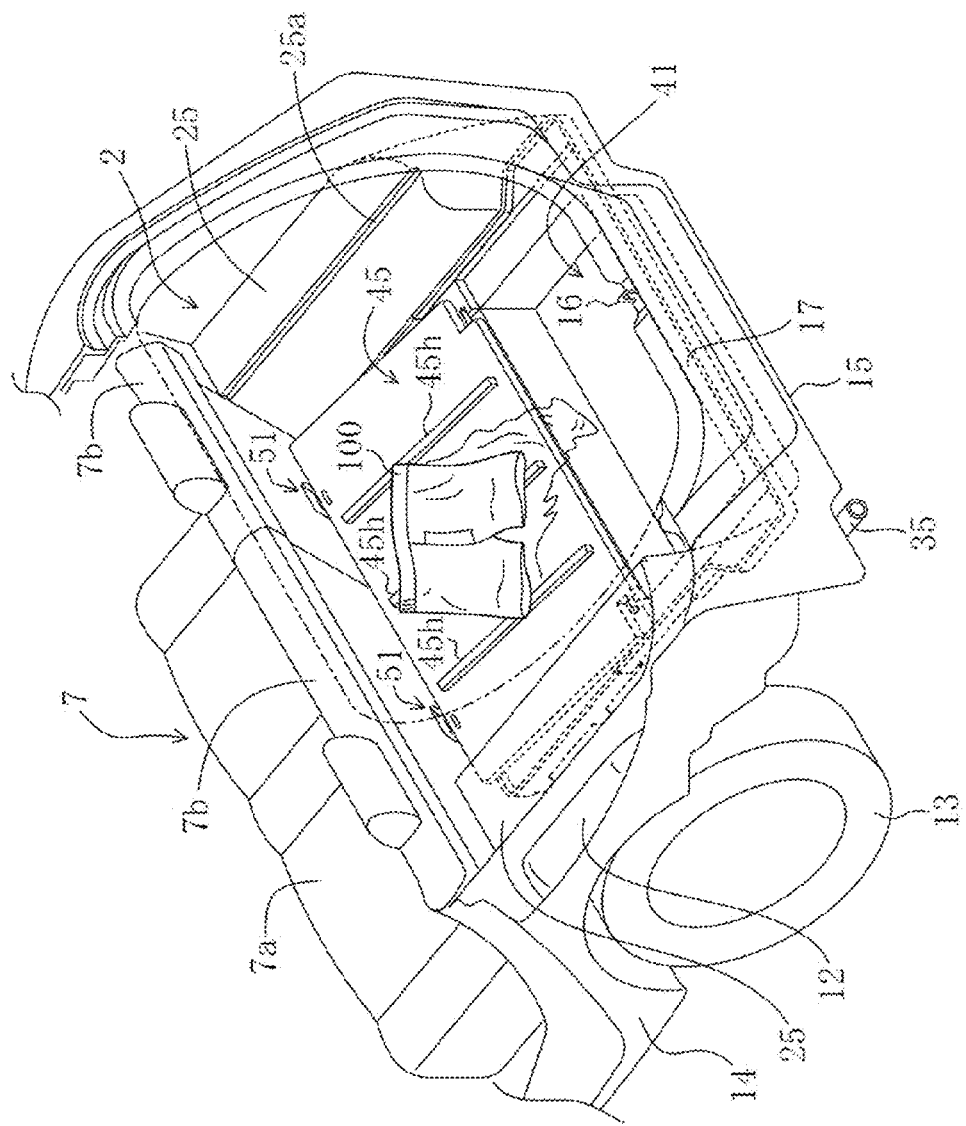
FIG. 13 is a perspective view of the cargo compartment showing a case in which the reversible cargo board is held in a specific state by the board holders in an open position, and a dripping-wet load is placed on the reversible cargo board.

Therefore, when the board holding hook 53 is set in the projected state and the reversible cargo board 45 positioned at the closed position is rotated around the hinge shafts 45*e*, the board holding hooks 53 and the engaging concave parts 45*g* of the reversible cargo board 45 engage with each other. At this time, each hinge shaft 45*e* of the reversible cargo board 45 remains in a state in which it is fitted in and supported by each bearing part 41*k*. Thus, as shown in FIGS. 1 and 13, the upper face of the reversible cargo board 45 inclines downwardly to the rear, and the rear end of the reversible cargo board 45 positions behind the front end of the trunk box 41 (particularly, substantially at the same position as the rear end of the slope face part 41*j*). In this way, the reversible cargo board 45 is held in the specific state by the board holder 51 in the open position. Note that the rear part of the lower face of the reversible cargo board 45 in the specific state may contact the slope face part 41*j* when a load is placed on the reversible cargo board 45 but it does not contact the slope face part 41*j* in a state in which a load is not placed.

A waterproof treatment is applied to the upper face (that is, the lower face when positioned at the closed position) of the reversible cargo board 45 held by the board holder 51 in the specific state (the reversible cargo board 45 positioned at the open position). For this reason, a dripping-wet load can be placed on the reversible cargo board 45 which is in the open position and is held in the specific state, as shown in FIG. 13. Water drops from the dripping-wet load (e.g., dripping-wet swimwear 100 in FIG. 13) placed on the reversible cargo board 45 flow to the rear on the upper face of the reversible cargo board 45, pass through the rear end part of the slope face part 41*j* from the rear end of the reversible cargo board 45, and then fall into the trunk box 41.

Hair implantation similar to the upper face of the rear cargo floor board 40 may preferably be applied to the upper face of the reversible cargo board 45 positioned at the closed position to unify them in material as a floor of the rear cargo area 8; however, this may not be necessary. If the hair implantation is not applied, the waterproof treatment may instead be applied to the reversible cargo board 45.

A plurality of projected ribs 45*h* (a single rib may also be possible) are formed on the upper face of the reversible cargo board 45 held by the board holders 51 in the specific state. In this embodiment, three projected ribs 45*h* projecting substantially upward and extending substantially in the front-and-rear direction are formed in an intermediate part of the upper face of the reversible cargo board 45 in the left-and-right direction so as to be spaced at substantially equal intervals in the left-and-right direction. These projected ribs 45*h* reduce the reversible cargo board 45 in weight, and the support rigidity of the dripping-wet load, which becomes quite heavy by containing a lot of moisture, can be increased. In addition, by the projected ribs 45*h* extending in the front-and-rear direction, water drops from the dripping-wet load placed on the reversible cargo board 45 can be effectively led into the trunk box 41. Such projected ribs 45*h* may not be necessary.

That is, alternatively, one or more grooves extending in the front-and-rear direction may be formed in an intermediate part in the left-and-right direction of the upper face of the reversible cargo board 45 positioned at the open position, instead of the projected ribs 45*h*. The projected ribs 45*h* and the grooves may not be necessary.

The height of the board holder 51 in the rear face of the seat back 7*b* may be set such that the inclined angle of the upper face of the reversible cargo board 45 becomes an appropriate angle (i.e., an angle at which water drops on the reversible cargo board 45 easily flow to the rear and a load on the reversible cargo board 45 does not slide down easily). In this embodiment, even if the rear seat 7 is made into a folded state as described later, the reversible cargo board 45 can be held in the specific state by the board holders 51. Thus, it may be preferable that the board holders 51 are set to an appropriate height taking the position of the board holders 51 when the rear seat 7 is made into the folded state also into consideration.

Figure 14:
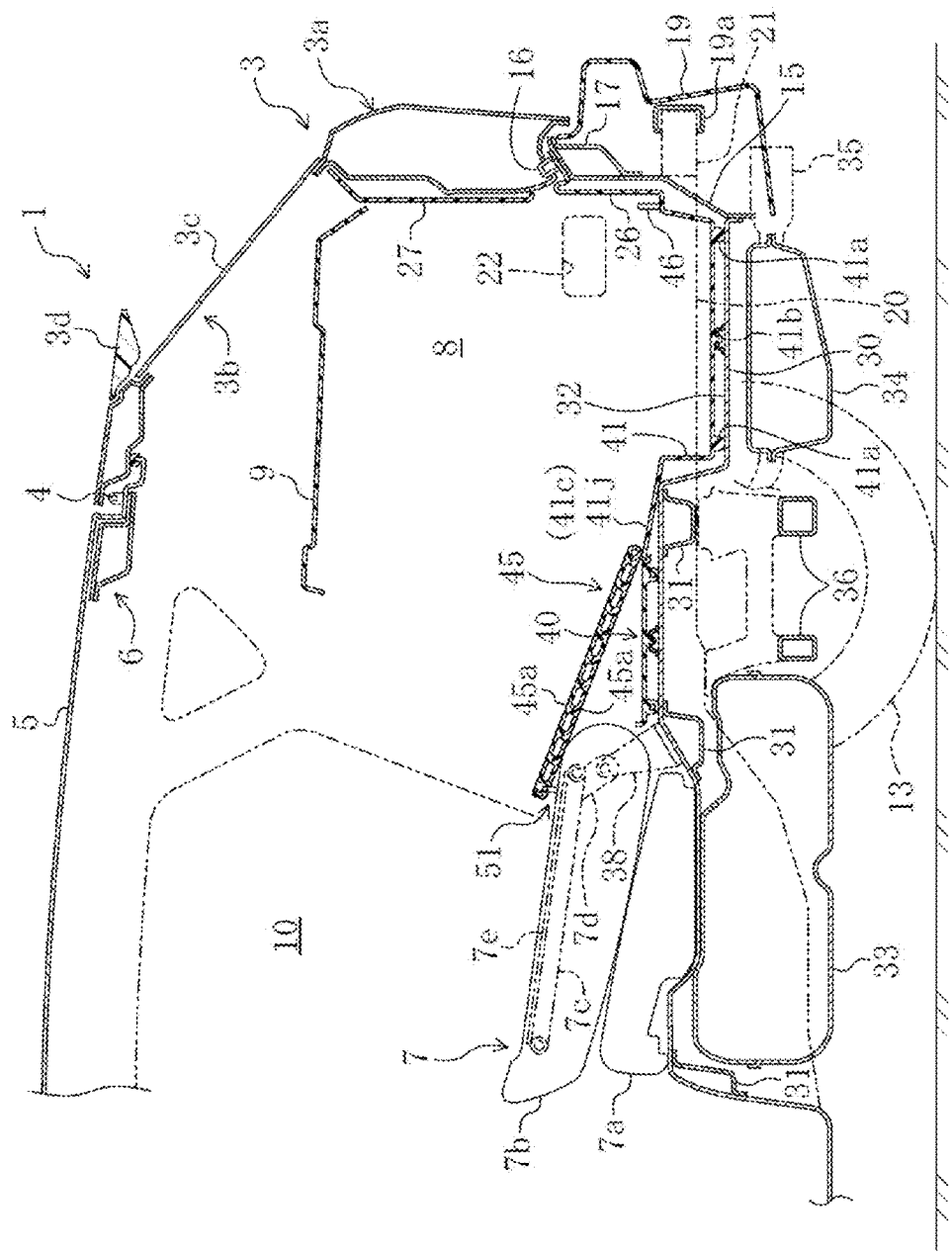
FIG. 14 is a view corresponding to FIG. 1, showing a state in which the reversible cargo board is held in a specific state by the board holders in a folded state of the seat.
Figure 15:
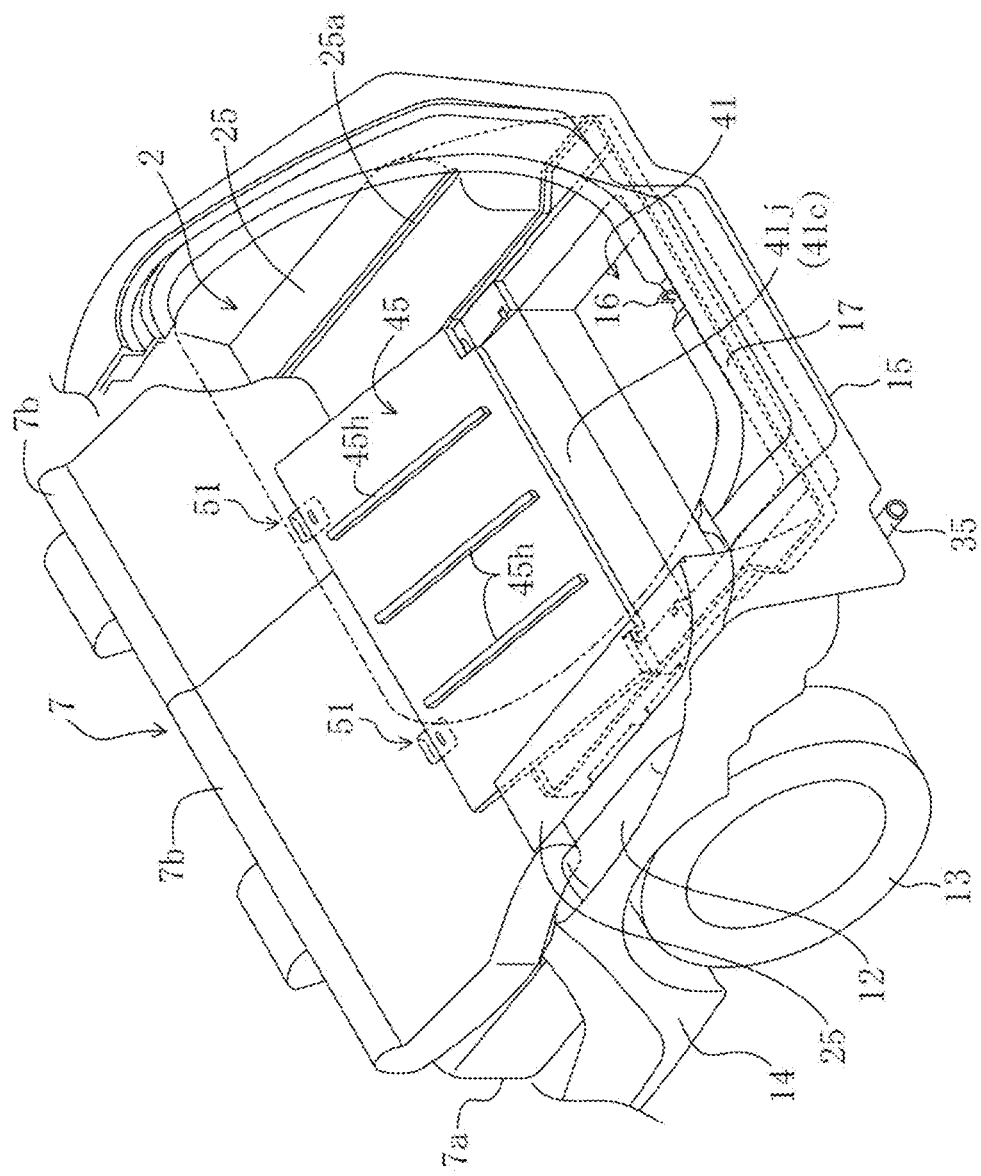
FIG. 15 is a perspective view of the cargo compartment showing a state in which the reversible cargo board is held in the specific state by the board holders in the folded state of the seat.
Figure 16:
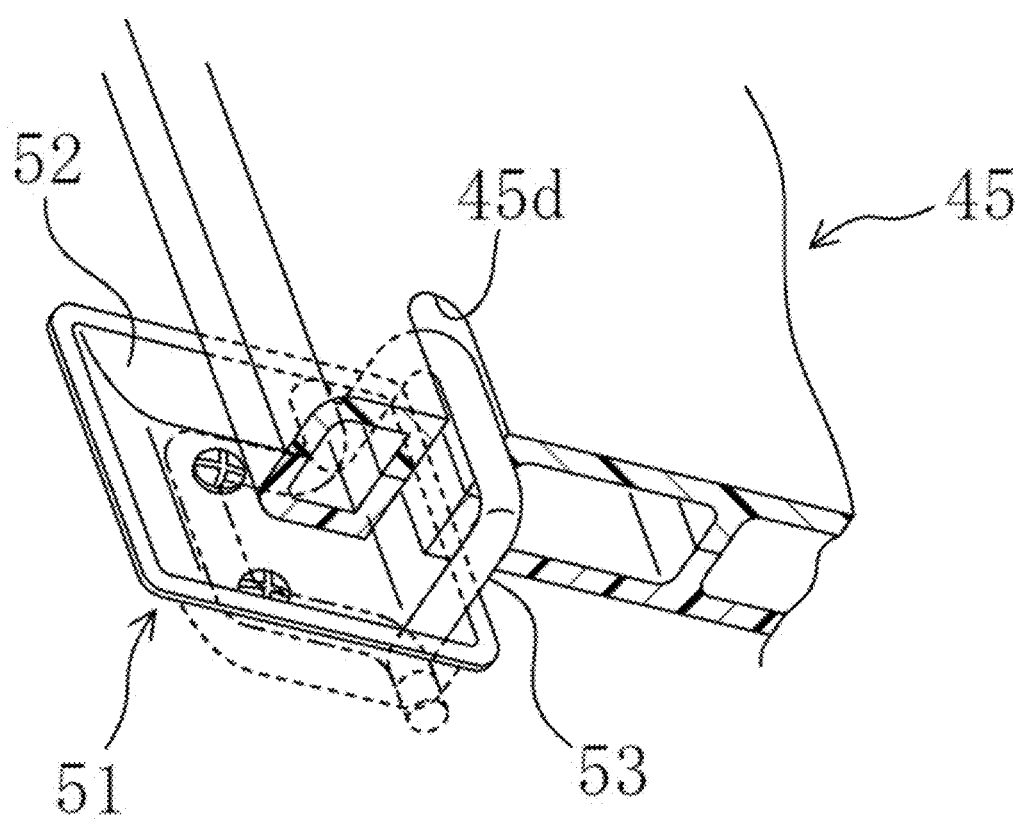
FIG. 16 is a perspective view showing the engagement state between the board holding hook of the board holder and the engaging concave part of the reversible cargo board in the folded state of the seat (a cross-sectional perspective view for the reversible cargo board).

As shown in FIGS. 14 and 15, the board holders 51 can hold the reversible cargo board 45 in the specific state not only in the unfolded state of the rear seat 7 but in the folded state. In other words, in the folded state of the rear seat 7, the rear face of the seat back 7*b* faces upward, and the board holding hooks 53 project upward from the rear face. Similar to the engaging hooks 46 inserted into the elongate holes 45*d* of the reversible cargo board 45 when the reversible cargo board 45 is positioned at the closed position, the board holding hooks 53 projecting upward are inserted from an upper face side when the reversible cargo board 45 is positioned at the closed position into the elongate holes 45*d* to engage the board holding hooks 53 with the elongate holes 45*d* (refer to FIG. 16).

Because the board holding hooks 53 locate forward in the folded state of the rear seat 7 from in the unfolded state of the rear seat 7, in order to insert the board holding hooks 53 into the elongate holes 45*d*, it may be necessary to move the reversible cargo board 45 to the front from the position of the reversible cargo board 45 held by the board holder 51 in the unfolded state of the rear seat 7. For this reason, the hinge shafts 45*e* are removed from the bearing parts 41*k*, and the board holding hooks 53 are inserted into the elongate holes 45*d* so that the rear end of the reversible cargo board 45 is placed on a part in the proximity of the front end of the slope face part 41*j*. At this time, the part in the proximity of the front end of the reversible cargo board 45 contacts the rear end part of the upper face (rear face) of the seat back 7*b* of the rear seat 7 in the folded state. By this, the reversible cargo board 45 is held in the specific state by the board holder 51 in which the upper face of the reversible cargo board 45 inclines downwardly to the rear and the rear end of the reversible cargo board 45 locates behind the front end of the trunk box 41. Also in this holding state, the reversible cargo board 45 is in the state in which it is inverted in the front-and-rear direction and in the vertical direction from the closed position. When a dripping-wet load is placed on the reversible cargo board 45, water drops from the dripping-wet load on the reversible cargo board 45 flow to the rear on the reversible cargo board 45, then flow to the slope face part 41*j* from the rear end of the reversible cargo board 45, and then flow to the rear on the slope face part 41*j* to finally flow into the trunk box 41.

Note that the rear seat 7 may or may not be foldable, and if it is foldable, the rear seat 7 may be configured to hold the reversible cargo board 45 by the board holders 51 only when it is in the unfolded state. Therefore, in this embodiment, by making the reversible cargo board 45 into the open position to hold it in the specific state by the board holders 51, a dripping-wet load may be placed on the reversible cargo board 45 as well as on the trunk box 41. As a result, a space for placing a dripping-wet load can be expanded forward of the trunk box 41, and when there are a large number of dripping-wet loads or when there is a large dripping-wet load compared with a load accommodation volume of the trunk box 41, the dripping-wet load(s) can be accommodated in the rear cargo area 8 so that the upper face of the floor (the rear cargo floor board 40) of the rear cargo area 8 does not get dripping-wet.

If the rear seat 7 is made into the folded state to hold the reversible cargo board 45 by the board holders 51, the reversible cargo board 45 held in the specific state by the board holders 51 in the folded state of the rear seat 7 locates forward of a position of the reversible cargo board 45 held in the specific state by the board holders 51 in the unfolded state of the rear seat 7, and thereby, the space for placing the dripping-wet load(s) can be further expanded forward without being limited by the rear seat 7.

Embodiment 2

Figure 17:
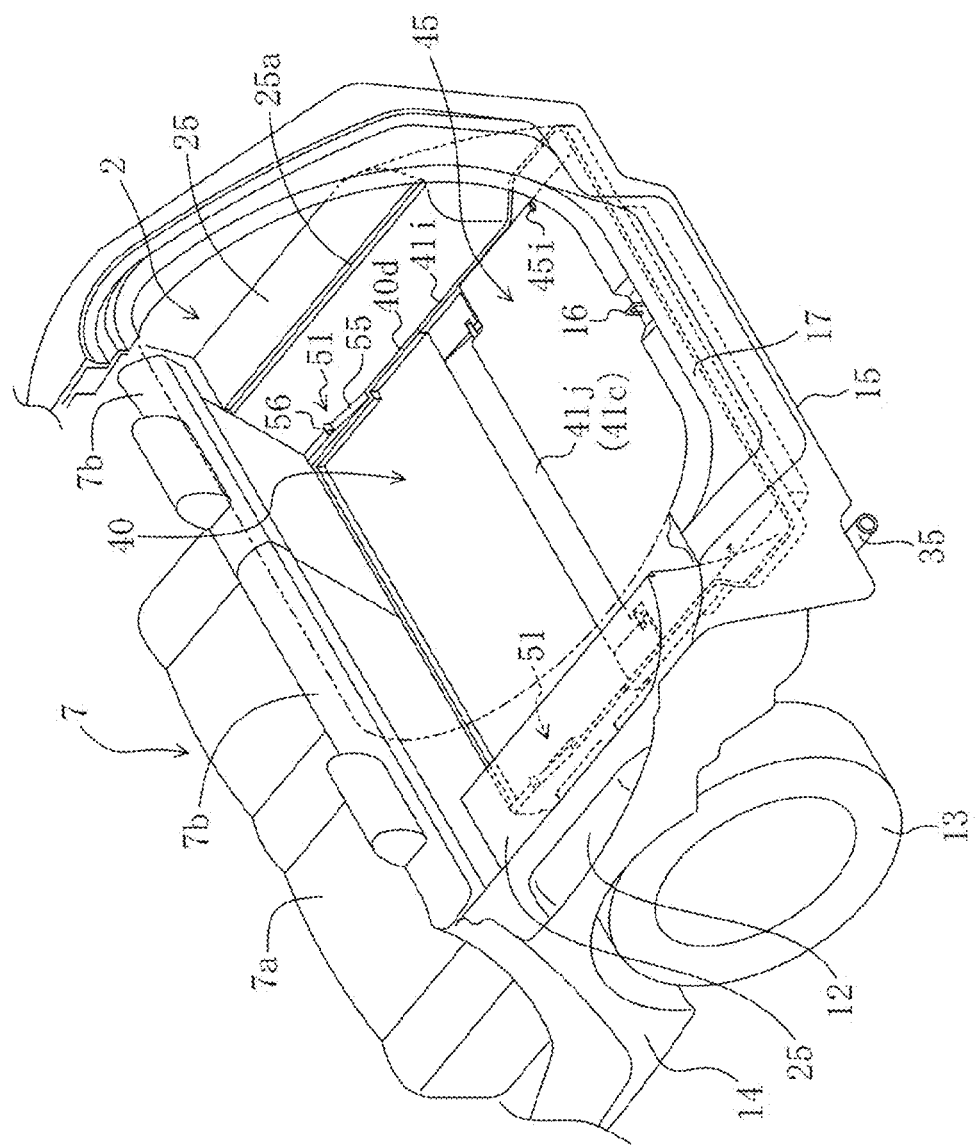
FIG. 17 is a perspective view of the cargo compartment showing a state in which the reversible cargo board is positioned at a closed position in Embodiment 2.
Figure 18:
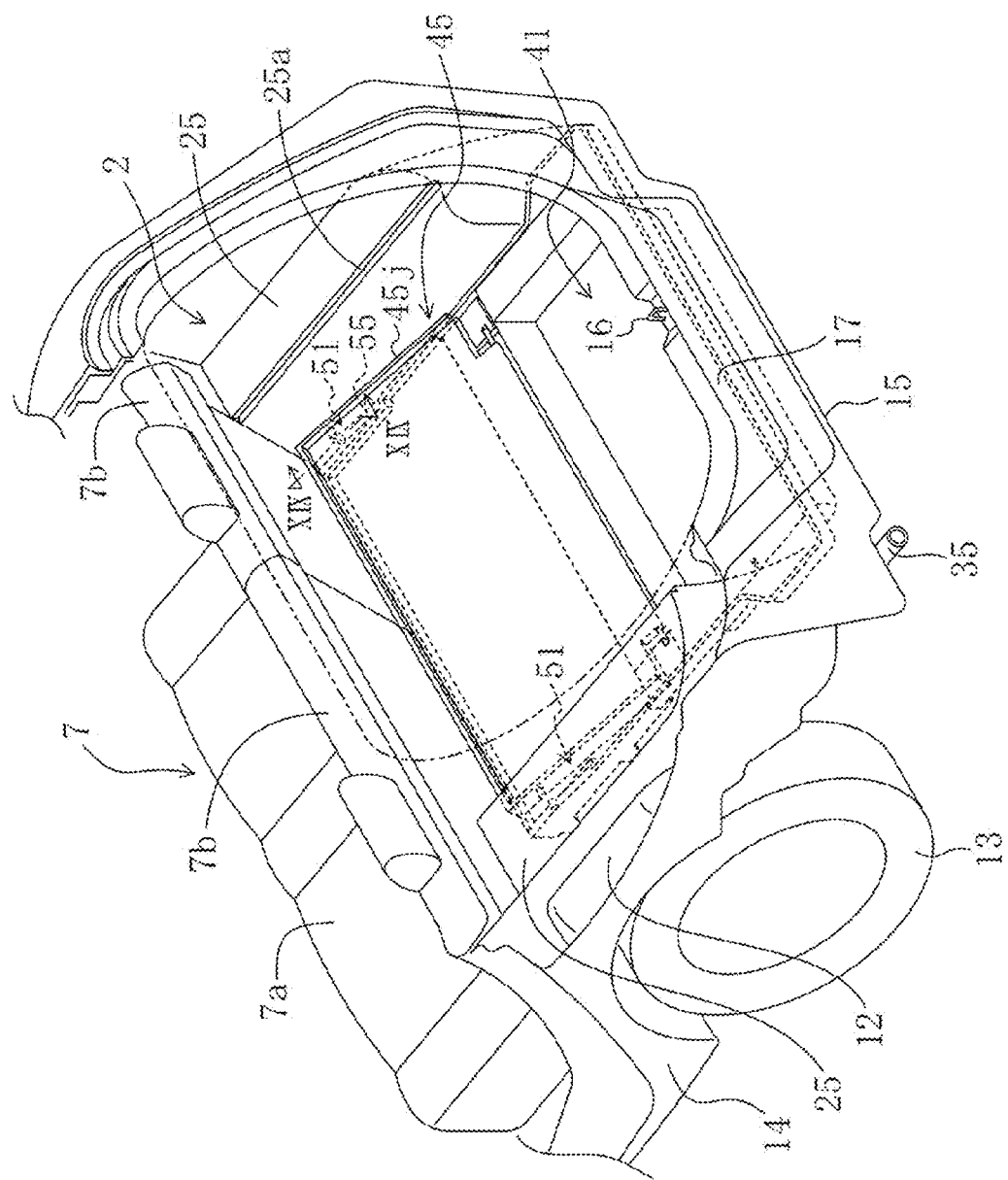
FIG. 18 is a perspective view of the cargo compartment showing a state in which the reversible cargo board is held in the specific state by the board holders at the open position in Embodiment 2.

FIGS. 17 and 18 show Embodiment 2 of the invention where the board holders 51 are formed in the side walls (cargo compartment side trim panels 25) on both left and right of the rear cargo area 8.

Figure 19:
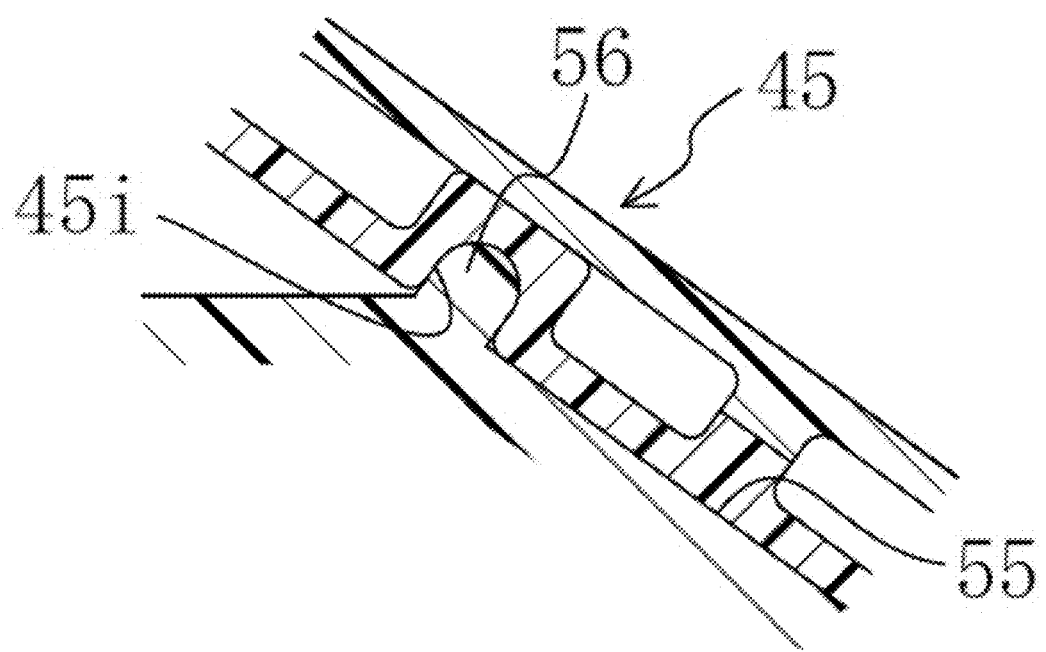
FIG. 19 is a cross-sectional view taken along a line XIX-XIX of FIG. 18.
Figure 20:
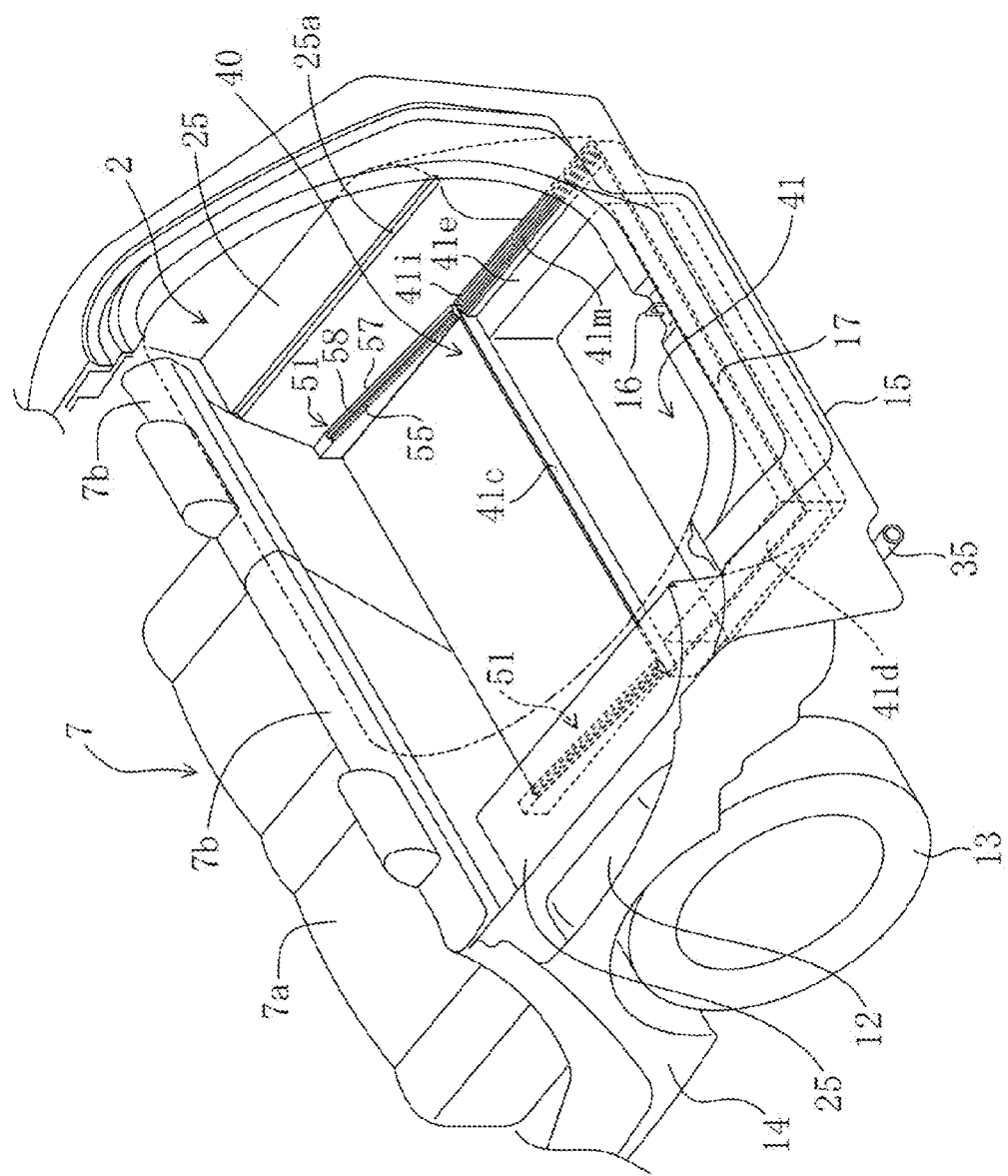
FIG. 20 is a perspective view of the cargo compartment showing a state in which the reversible cargo board is removed in Embodiment 3.
Figure 21:
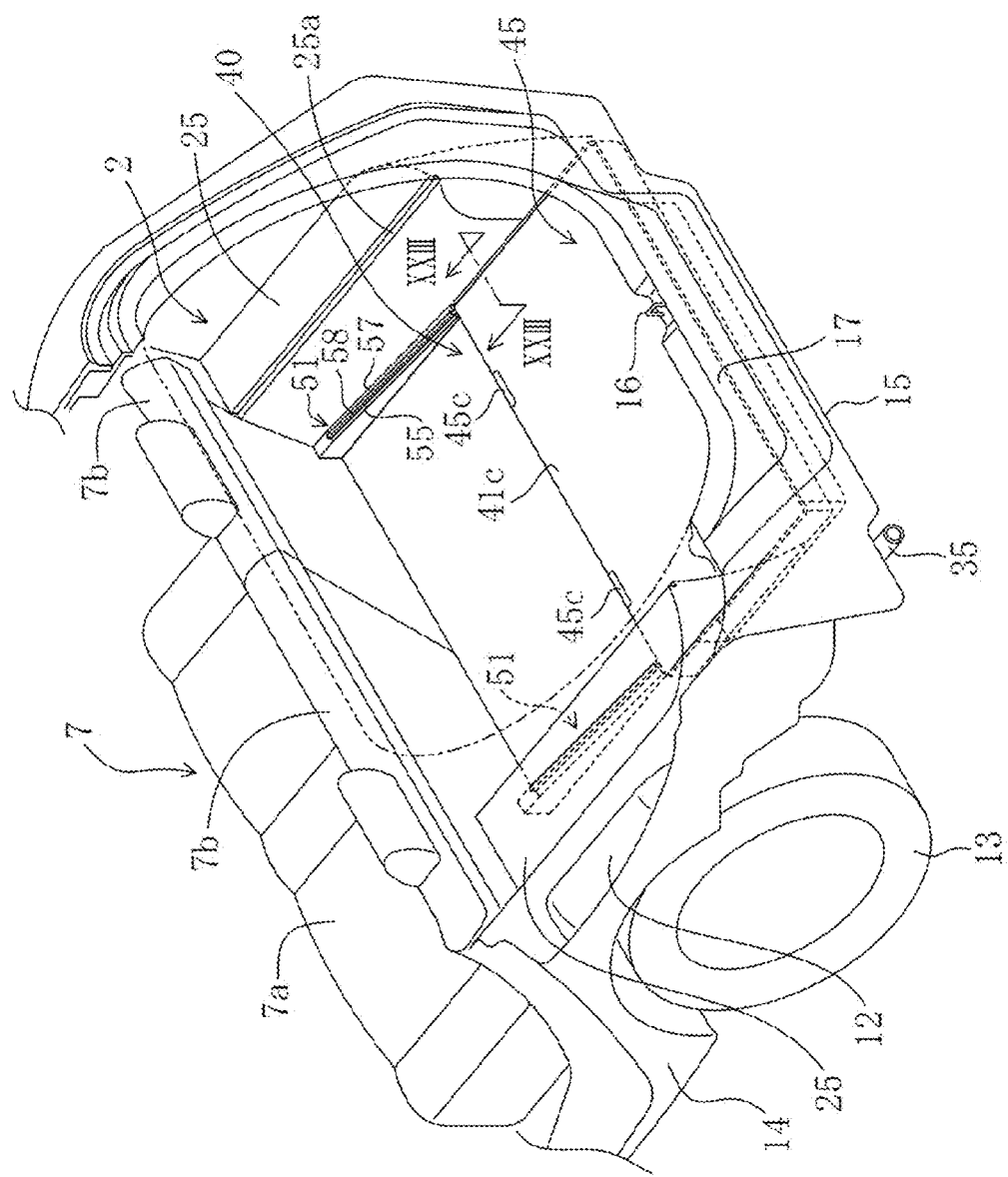
FIG. 21 is a perspective view of the cargo compartment showing a state in which the reversible cargo board is positioned at the closed position in Embodiment 3.

Specifically, the board holders 51 are formed in front parts of the both left and right cargo compartment side trim panels 25, respectively, and each has a placing surface 55 onto which the reversible cargo board 45 is placed. The placing surface 55 inclines downwardly to the rear, and thereby, the upper face of the reversible cargo board 45 placed on the placing surfaces 55 inclines downwardly to the rear. A projected part 56 is formed in a front end part of each placing surface 55. As shown in FIG. 19, when the reversible cargo board 45 is placed on the placing surfaces 55, the projected parts 56 engage with concave parts 45i formed in a front end part of the lower face of the reversible cargo board 45 (a rear end part of the upper face of the reversible cargo board 45 positioned at the closed position). Then, the reversible cargo board 45 positioned at the closed position is rotated around the hinge shafts 45e similar to Embodiment 1 to engage each concave part 45i with the projected part 56 mutually to place the reversible cargo board 45 on the placing surfaces 55. Thereby, the reversible cargo board 45 is held on the placing surfaces 55 in the specific state. Thus, in this embodiment, the placing surface 55 and the projected part 56 constitute each board holder 51.

Note that, in this embodiment, the engaging concave parts 45g and the projected ribs 45h as well as the elongate holes 45d and the engagement grooves 45f do not exist in the reversible cargo board 45, and the engaging hooks 46 do not exist in the rear flange part 41f of the trunk box 41.

In this embodiment, in a front end part and both left and right end parts of the upper face of the reversible cargo board 45 held by the board holders 51 in the specific state, standing wall parts 45j projecting upward and extending along the end parts are formed. By the standing wall parts 45j, when acceleration to the front or to the side occurs at the time of deceleration or turning of the automobile 1, or when the automobile 1 is parked at a down slope or side slope, they can prevent water drops on the reversible cargo board 45 from flowing to the front or the sides of the reversible cargo board 45. The standing wall parts 45j may be formed only in the front end part of the upper face of the reversible cargo board 45 held by the board holders 51, or the standing wall parts 45j may be formed only in the both left and right end parts. In addition to the standing wall parts 45j, projected ribs 45h (or grooves) similar to Embodiment 1 may be provided to an intermediate part in the left-and-right direction of the upper face of the reversible cargo board 45 positioned at the open position.

Embodiment 3

FIGS. 20 to 24 show Embodiment 3 of the invention. In the figures, each board holder 51 has the placing surface 55 inclined similar to Embodiment 2, and a groove 57 extending in the front-and-rear direction is formed from a front end to a rear end of each placing surface 55 in an outside part of the placing surface 55 in the vehicle width direction.

In this embodiment, the shape of the trunk box 41 differs from those of Embodiments 1 and 2, and the slope face part 41j, the front edge part of the left flange part 41d, the left extension part 41g, the front edge part of the right flange part 41e, and the right extension part 41h do not exist. The front flange part 41c forms a narrow rib shape in which its upper face is located substantially at the same height as the upper face of the rear cargo floor board 40. Both left and right end parts of the front flange part 41c extend to the front end parts of the left and right flange parts 41d and 41e, respectively. The left and right end parts are connected with the projected parts 41i formed in the left end part of the left flange part 41d and the right end part of the right flange part 41e, respectively (in this embodiment, the upper face of the rear cargo floor board 40 is located substantially at the same height as the upper face of the projected part 41i).

The rear end of the rear cargo floor board 40 is in contact with the front end of the front flange part 41c of the rib shape. The projected parts 40d do not exist in the rear cargo floor board 40.

Projected parts 41m (refer to FIG. 23) extending in the front-and-rear direction are formed in the left and right flange parts 41d and 41e of the trunk box 41, respectively. Groove parts 45k extending in the front-and-rear direction and into/with which the projected parts 41m fit and engage are formed in both left and right end parts of the lower face of the reversible cargo board 45 positioned at the closed position and for covering the opening of the trunk box 41, respectively.

In this embodiment, the finger-hooking parts 45c of the reversible cargo board 45 are formed in the front end part (at two locations) of the reversible cargo board 45 so as to be in a notch shape, and an operator can hook his/her fingers on the finger-hooking parts 45c of the notch shape to lift the front end part of the reversible cargo board 45. The hinge shafts 45e do not exist in the reversible cargo board 45 and, thus, in order to move the reversible cargo board 45 to the open position from the closed position, the reversible cargo board 45 is lifted to release the engagement of the projected parts 41m with the groove parts 45k, and then, the reversible cargo board 45 is moved to the front as it is without inverted in the front-and-rear direction and in the vertical direction.

Note that, also in this embodiment, similar to Embodiment 2, the engaging concave parts 45g and the projected ribs 45h as well as the elongate holes 45d and the engagement grooves 45f do not exist in the reversible cargo board 45, and the concave parts 45i and the standing wall parts 45j of Embodiment 2 do not exist as well. The engaging hooks 46 do not exist in the rear flange part 41f of the trunk box 41.

A projected part 58 extending in the front-and-rear direction is formed in an intermediate part in the horizontal direction of each placing surface 55, specifically from the front end to the rear end of the placing surface 55. The projected part 58, the cargo compartment side trim panel 25, and the placing surface 55 forms a groove 57 in which a part of the placing surface 55 on the side of the cargo compartment side trim panel 25 is formed in a groove shape (refer to FIG. 24).

Figure 22:
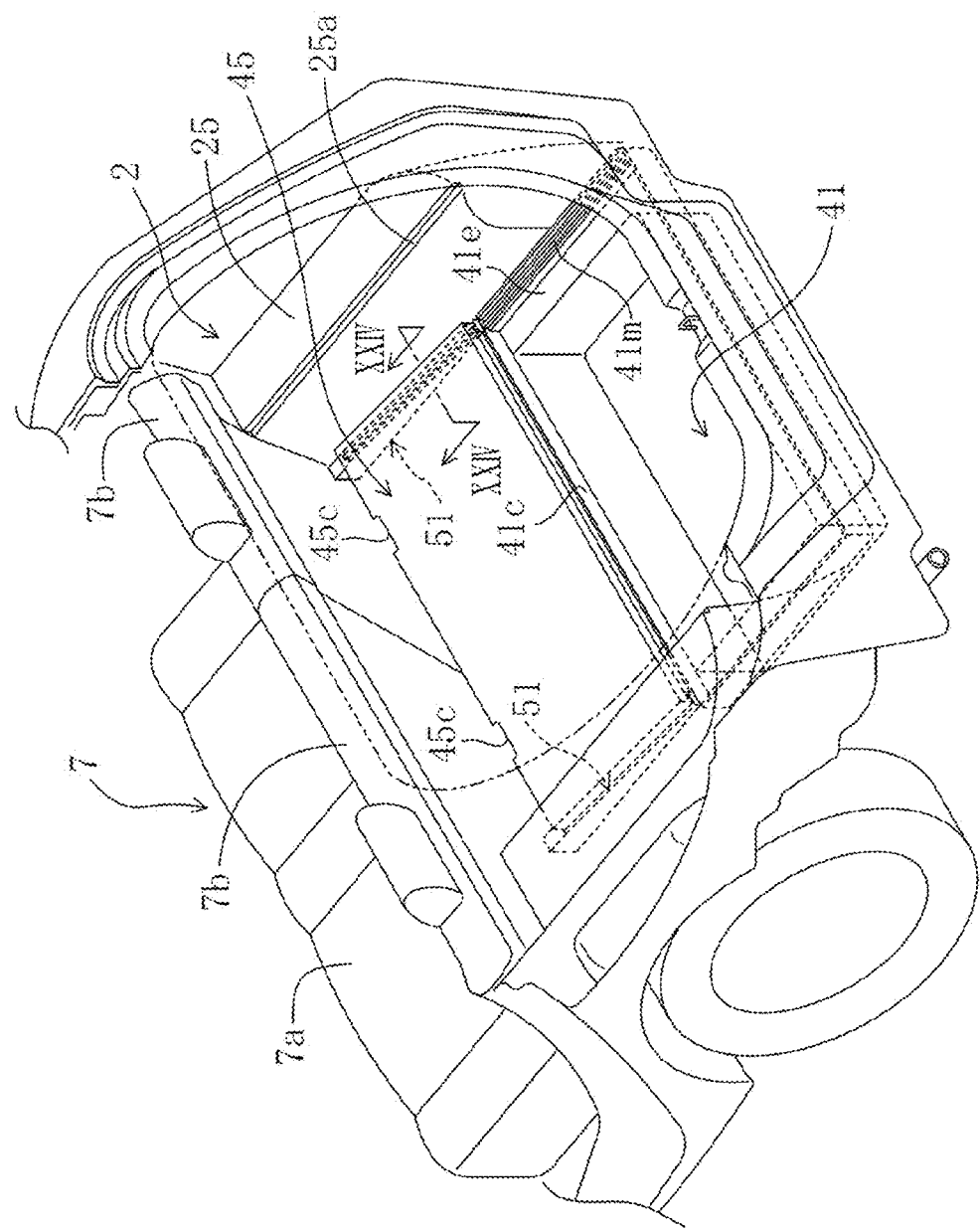
FIG. 22 is a perspective view of the cargo compartment showing a state in which the reversible cargo board is held in the specific state by the board holders at the open position in Embodiment 3.
Figure 23:
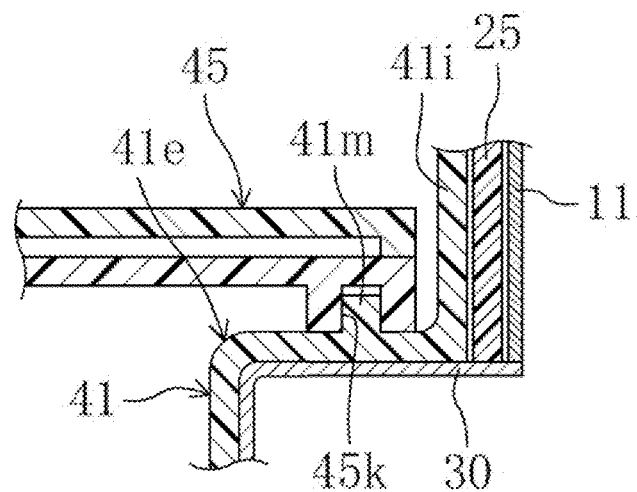
FIG. 23 is a cross-sectional view taken along a line XXIII-XXIII of FIG. 21.
Figure 24:
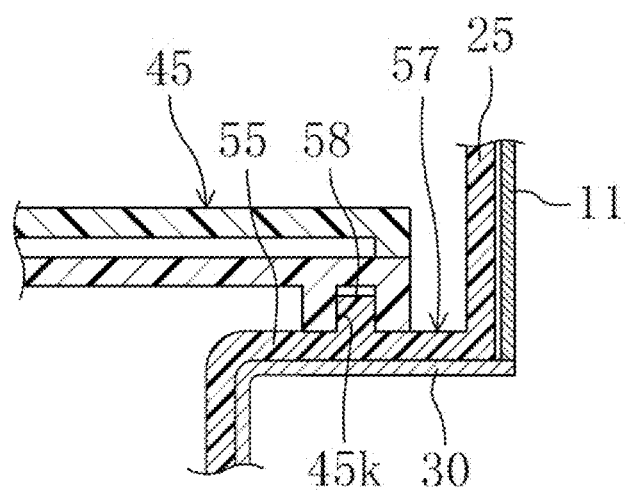
FIG. 24 is a cross-sectional view taken along a line XXIV-XXIV of FIG. 22.

When the reversible cargo board 45 is in the open position, the reversible cargo board 45 is held in the specific state on the placing surfaces 55 by the groove parts 45k of the reversible cargo board 45 engaging with the projected parts 58 (refer to FIGS. 22 and 24). By this, in this embodiment, the placing surface 55 and the projected part 58 constitute each board holder 51. The rear end of the reversible cargo board 45 positioned at the open position and held by the board holders 51 locates slightly rearward of the front end of the trunk box 41. In other words, the rear end of the reversible cargo board 45 locates above the opening of the trunk box 41, and by this, water drops on the reversible cargo board 45 enter into the trunk box 41. The reversible cargo board 45 may be entirely applied with the waterproof treatment.

Note that the rear end of the reversible cargo board 45 held by the board holders 51 may enter into the trunk box 41 from the opening of the trunk box 41.

The rear ends of the placing surfaces 55 and the grooves 57 are located at a position in agreement with the front ends of the left and right flange parts 41d and 41e of the trunk box 41 when seen from above. Thereby, even if water drops on the reversible cargo board 45 flow out to the sides of the reversible cargo board 45, the water drops fall into the grooves 57 to flow rearwardly through the grooves 57, and then flow to the left and right flange parts 41d and 41e of the trunk box 41 from the rear ends of the grooves 57.

Therefore, in this embodiment, it is not necessary to form the standing wall parts 45j as described in Embodiment 2 in both left and right end parts of the upper face of the reversible cargo board 45 positioned at the open position, and thereby allowing water drops on the reversible cargo board 45 to flow to the sides of the reversible cargo board 45.

Embodiment 4

Figure 25:
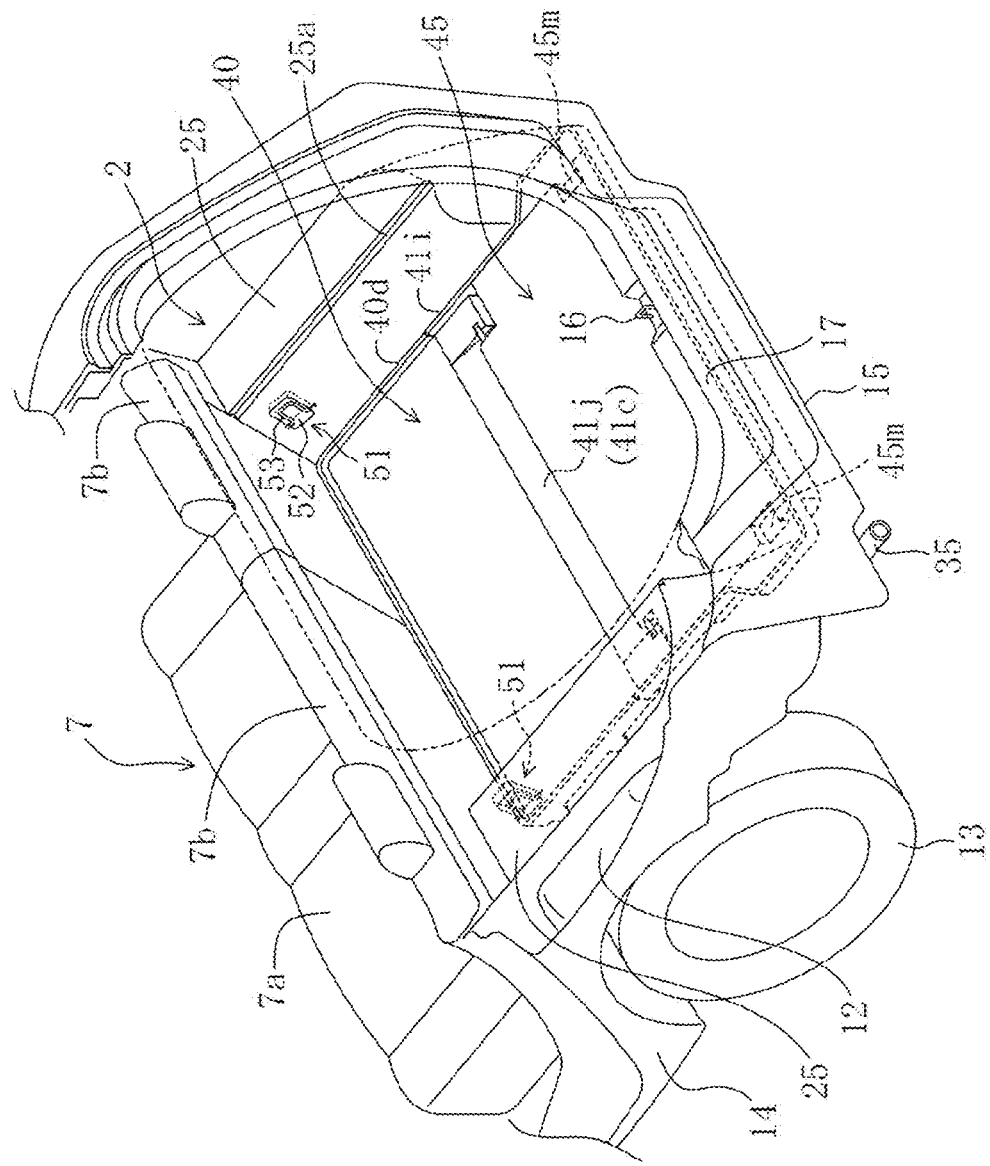
FIG. 25 is a perspective view of the cargo compartment showing a state in which the reversible cargo board is positioned at the closed position in Embodiment 4.
Figure 26:
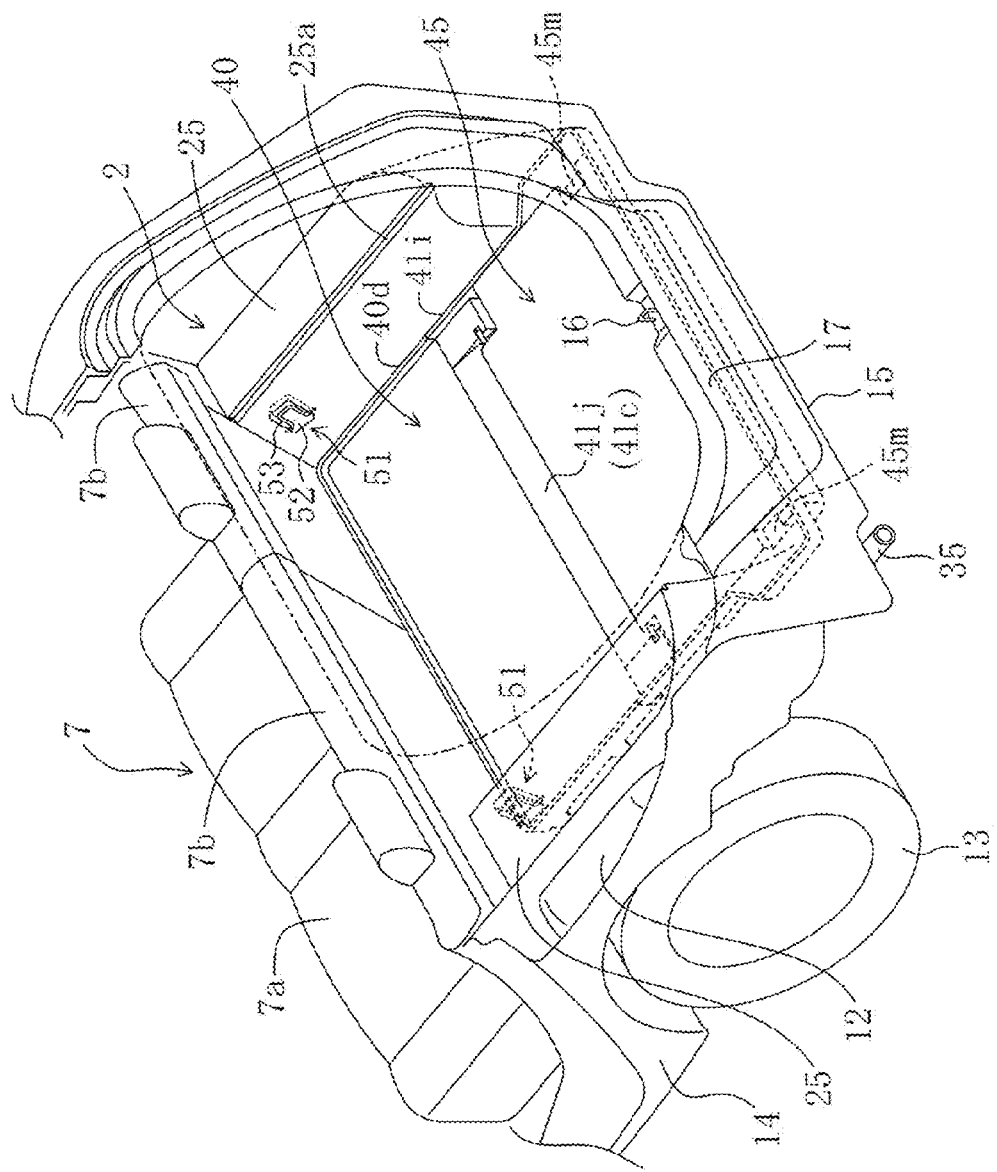
FIG. 26 is a perspective view of the cargo compartment showing a state in which the reversible cargo board is held in the specific state by the board holders at the open position in Embodiment 4.

FIGS. 25 and 26 show Embodiment 4 of the invention. In the figures, the reversible cargo board 45 is configured to be positioned at the open position by switching between a state in which it is held by the board holders 51 and a state in which it is placed on the upper face of the floor of the rear cargo area 8 without the board holders 51 being intervened.

That is, although this embodiment is similar to Embodiment 2 in that the board holders 51 are provided to the both left and right side walls of the rear cargo area 8, the board holders 51 are configured to be movable so that the reversible cargo board 45 can be placed on the upper face of the rear cargo floor board 40 (the upper face of the floor of the rear cargo area 8) without the board holders 51 being intervened.

Specifically, each board holder 51 is constituted with the retractable hook bezel 52 and the board holding hook 53 similar to the board holder 51 of Embodiment 1 provided to the rear face of the seat back 7b of the rear seat 7. In this embodiment, the retractable hook bezels 52 are fixed to the left and right inner wheel well panels 11 via the cargo compartment side trim panels 25, respectively. Further, each board holding hook 53 is rotatably attached to a lower end part of the retractable hook bezel 52, and thereby it can be switched between a state in which it is accommodated in the retractable hook bezel 52 (a state in which it is escaped from the rear cargo area 8) and a state in which it projects into the rear cargo area 8.

The reversible cargo board 45 is configured similar to Embodiment 2. However, engaging concave parts 45m for engaging with the board holding hooks 53 are formed in the front end part on the lower face of the reversible cargo board 45 positioned at the open position (a rear end part on the upper face of the reversible cargo board 45 positioned at the closed position), instead of the concave parts 45i.

When holding the reversible cargo board 45 by the board holders 51, the board holding hooks 53 are set into a state in which they project, and the engaging concave parts 45m of the reversible cargo board 45 and the board holding hooks 53 are engaged with each other. Thereby, the reversible cargo board 45 is held by the board holders 51 in the specific state (refer to FIG. 26).

On the other hand, when the board holding hooks 53 are escaped from the rear cargo area 8, the reversible cargo board 45 will not be held by the board holders 51 at the open position, but will be placed on the upper face of the rear cargo floor board 40. In this case, the upper face of the reversible cargo board 45 placed on the upper face of the rear cargo floor board 40 (the lower face of the reversible cargo board 45 positioned at the closed position) is substantially horizontal. Thereby, the load accommodation space of the rear cargo area 8 increases compared with the case in which the reversible cargo board 45 is held in the specific state.

Therefore, in this embodiment, a degree of freedom in the case of accommodating a normal load, which is not dripping-wet, in the rear cargo area 8 can be enhanced.

Note that the configurations of the board holders 51 and the reversible cargo board 45 may not be limited to those of the embodiments described above. For example, the board holders 51 may be provided to the upper face of the rear cargo floor board 40 or the floor panel 30.

The embodiments described above may be useful for cargo compartment structures arranged in a cargo compartment of a rear part of an automobile, as well as is useful particularly when accommodating dripping-wet load(s) in the trunk box.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A cargo compartment structure for an automobile comprising:
    a trunk box disposed in a cargo compartment in a rear part of the automobile, the trunk box having an opening on its upper side;
    a cargo board having an upper face and a lower face, the cargo board capable of changing its position between a closed position where the opening is covered by the cargo board, and an open position where the opening is opened, and where the upper face of the cargo board in the open position is waterproof, the open position of the cargo board being frontward of the closed position, and the cargo board being in the cargo compartment in the open position; and
    a board holder for holding the cargo board in a specific state so that the upper face of the cargo board is downwardly inclined toward a rear side of the automobile so that water flows from the cargo board and into the trunk box, and so that while the cargo board is in the open position, a rear end of the cargo board is disposed rearward of a front end of the trunk box;
    wherein the board holder is provided on a backside of a seat back of a seat that is disposed frontward of the cargo compartment, and
    wherein the board holder holds the cargo board in the specific state while the seat is in an unfolded state.

2. The cargo compartment structure according to claim 1 wherein,
    the seat is capable of being folded into a folded state with the seat back folded frontward on a seat cushion of the seat, and
    the board holder is capable of holding the cargo board in the specific state even while the seat is in the folded state.

3. The cargo compartment structure according to claim 2 wherein,
    the cargo board that is held in the specific state while the seat is in the folded state is disposed frontward of that while the seat is in the unfolded state.

4. A cargo compartment structure for an automobile comprising:
    a trunk box disposed in a cargo compartment in a rear part of the automobile, the trunk box having an opening on its upper side;
    a cargo board capable of changing its position between a closed position where the opening is closed by the cargo board, and an open position where the opening is opened, the open position of the cargo board being frontward of the closed position, and the cargo board being in the cargo compartment in the open position; and a board holder for holding the cargo board in a specific state so that a top surface of the cargo board is downwardly inclined toward a rear side of the automobile and so that while the cargo board is in the open position, a rear end of the cargo board is disposed rearward of a front end of the trunk box, the board holder provided on both left and right side walls of the cargo compartment, and the board holder comprising a placing surface on which the cargo board is placed, the placing surface formed on the side walls and downwardly inclined toward the rear side of the automobile, and the placing surface comprising a groove extending in a longitudinal direction of the automobile.

* * * * *